(12) United States Patent
Wei

(10) Patent No.: US 12,470,816 B2
(45) Date of Patent: Nov. 11, 2025

(54) VIDEO SHOOTING METHOD AND ELECTRONIC DEVICE

(71) Applicant: Honor Device Co., Ltd., Shenzhen (CN)

(72) Inventor: Qiuyang Wei, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 209 days.

(21) Appl. No.: 17/792,527

(22) PCT Filed: Apr. 19, 2021

(86) PCT No.: PCT/CN2021/088189
§ 371 (c)(1),
(2) Date: Jul. 13, 2022

(87) PCT Pub. No.: WO2021/213341
PCT Pub. Date: Oct. 28, 2021

(65) Prior Publication Data
US 2023/0055623 A1 Feb. 23, 2023

(30) Foreign Application Priority Data

Apr. 24, 2020 (CN) .......................... 202010331367.7

(51) Int. Cl.
*H04N 23/667* (2023.01)
*G06T 7/20* (2017.01)
(Continued)

(52) U.S. Cl.
CPC ............. *H04N 23/667* (2023.01); *G06T 7/20* (2013.01); *H04N 23/45* (2023.01); *H04N 23/63* (2023.01); *G06T 2207/10016* (2013.01)

(58) Field of Classification Search
CPC ...... H04N 23/667; H04N 23/45; H04N 23/63; H04N 5/783; H04N 23/62; H04N 23/631;
(Continued)

(56) References Cited

U.S. PATENT DOCUMENTS 10,438,630 B2 * 10/2019 Nakagawa ............. G11B 27/02
10,785,415 B2 * 9/2020 Nakayama ................ G06F 3/14
(Continued)

FOREIGN PATENT DOCUMENTS

| CN | 104967803 A | 10/2015 |
|---|---|---|
| CN | 107395972 A | 11/2017 |

(Continued)

*Primary Examiner* — Helen Shibru
(74) *Attorney, Agent, or Firm* — Rimon PC

(57) ABSTRACT

This application relates to the field of terminal AI technologies, and discloses a video shooting method and an electronic device. The electronic device disclosed in this application is provided with a first camera and a second camera. After receiving an instruction for shooting a slow motion video, the electronic device can invoke the first camera to perform preview, and after detecting that a target moving object moves in a field of view of the first camera, determine a target shooting frame rate. Further, the electronic device invokes the second camera to shoot a slow motion video of the target moving object at the target shooting frame rate. In this way, the electronic device can determine a best shooting frame rate based on a moving speed of the target moving object. This achieves a high degree of intelligence, and can optimize a shooting effect.

18 Claims, 15 Drawing Sheets

(51) Int. Cl.
*H04N 23/45* (2023.01)
*H04N 23/63* (2023.01)

(58) Field of Classification Search
CPC ...... H04N 23/698; H04N 23/90; H04N 5/772;
H04N 5/76; H04N 23/60; H04N 23/632;
G06T 7/20; G06T 2207/10016
USPC .......................................................... 348/36
See application file for complete search history.

(56) References Cited

U.S. PATENT DOCUMENTS

| | | | |
|---|---|---|---|
| 10,812,768 B2 | 10/2020 | Youn et al. | |
| 10,979,626 B2 * | 4/2021 | Okita | ..................... H04N 5/772 |
| 11,064,108 B2 * | 7/2021 | Puttamalla | ............. H04N 23/90 |
| 11,343,441 B2 * | 5/2022 | Okuike | ................ G06V 20/582 |
| 11,417,249 B2 * | 8/2022 | Yamaguchi | ............ G09G 3/002 |
| 12,219,289 B2 * | 2/2025 | Zhao | ....................... H04N 5/783 |
| 2011/0149072 A1 | 6/2011 | Mccormack | |
| 2018/0233174 A1 | 8/2018 | Nakagawa | |
| 2020/0120265 A1 | 4/2020 | Brown et al. | |
| 2025/0080838 A1 * | 3/2025 | Smith | ................... G06F 1/1686 |

FOREIGN PATENT DOCUMENTS

| | | | | |
|---|---|---|---|---|
| CN | 107396019 A | 11/2017 | | |
| CN | 104967803 B | 1/2018 | | |
| CN | 109743505 A | 5/2019 | | |
| CN | 111526314 A | 8/2020 | | |
| EP | 3481048 A1 | 5/2019 | | |
| EP | 4064689 A1 * | 9/2022 | ........... | H04N 23/667 |

* cited by examiner

VIDEO SHOOTING METHOD AND ELECTRONIC DEVICE

CROSS-REFERENCE TO RELATED APPLICATIONS

This application is a National Stage of International Application No. PCT/CN2021/088189, filed on Apr. 19, 2021, which claims priority to Chinese Patent Application No. 202010331367.7, filed with the Chinese Patent Office on Apr. 24, 2020, and entitled "VIDEO SHOOTING METHOD AND ELECTRONIC DEVICE" which is incorporated herein by reference in its entirety.

TECHNICAL FIELD

This application relates to the field of artificial intelligence (artificial intelligence, AI) technologies, and in particular, to a video shooting method and an electronic device.

BACKGROUND

With development of technologies, an intelligent device provided with a camera can support more and more shooting functions, for example, a function of shooting a slow motion video. A principle of shooting a "slow motion video" is as follows: A shooting frame rate used when the intelligent device shoots a moving object is N times of a play frame rate, where N is an integer greater than or equal to 2. In this way, a moving speed of the moving object in the video played by the intelligent device is 1/N of an actual moving speed of the moving object, to obtain the "slow motion video" of the moving object. Currently, in an existing slow motion video shooting method, a shooting frame rate needs to be manually set by a user in advance. Consequently, a degree of intelligence is relatively low, and a video with the shooting frame rate set by the user cannot achieve a relatively good play effect, resulting in a poor shooting effect.

SUMMARY

This application provides a video shooting method and an electronic device, to resolve a problem in an existing video shooing method.

According to a first aspect, this application provides a video shooting method. The video shooting method is applied to an electronic device, the electronic device is provided with a first camera and a second camera, and the first camera and the second camera are different in at least one of a field of view (field of view. FOV) and a shooting direction. The method includes: receiving a shooting instruction entered by a user; invoking the first camera to perform preview; if it is detected that a target moving object moves in the FOV of the first camera, determining a target shooting frame rate based on a moving speed of the target moving object; and invoking the second camera to shoot a video of the target moving object at the target shooting frame rate.

The electronic device to which the method in this application is applied may be an electronic device that includes a first camera and a second camera. Both the first camera and the second camera may be rear-facing cameras of the electronic device or front-facing cameras of the electronic device, or one of the first camera and the second camera is a front-facing camera of the electronic device, and the other is a rear-facing camera of the electronic device. Further, the FOV of the first camera is different from that of the second camera, or the shooting direction of the first camera is different from that of the second camera, or both the FOV and the shooting direction of the first camera are different from those of the second camera.

After receiving the shooting instruction, the electronic device invokes the first camera to perform preview. After the target moving object enters the FOV of the first camera the electronic device can determine a shooting parameter such as the target shooting frame rate based on the moving speed of the target moving object. Then, the electronic device invokes the second camera to shoot a slow motion video of the target moving object by using the shooting parameter such as the determined target shooting frame rate.

It can be learned that, in this implementation, the electronic device can determine a shooting frame rate of the slow motion video. In this way, not only a degree of intelligence is high, but also a relatively suitable shooting frame rate can be determined, so that a shooting effect can be optimized, and user experience can be improved.

In a possible design, the method includes: when the shooting instruction is a first shooting instruction, determining a camera with a relatively large FOV as the first camera; or when the shooting instruction is a second shooting instruction, determining a camera with a relatively small FOV as the first camera.

During actual implementation, there are various scenarios in which a user wants to shoot a slow motion video, and moving tracks of the target moving object in different scenarios are different. For example, the target moving object may move from one point to another point, for example, a moving track of a traveling train. The target moving object may alternatively move around from a central point in an explosive manner, for example, moving tracks of fireworks during blooming. Based on this, the shooting instruction in this application may be a first shooting instruction or a second shooting instruction. When the shooting instruction is the first shooting instruction, the electronic device is configured to shoot a scenario in which the target moving object may move from one point to another point. Correspondingly, the electronic device determines a camera with a relatively large FOV as the first camera. When the shooting instruction is the second shooting instruction, the electronic device is configured to shoot a scenario in which the target moving object moves around from a central point in an explosive manner. Correspondingly, the electronic device determines a camera with a relatively small FOV as the first camera. It can be learned that the video shooting method in this application can be applied to a plurality of shooting scenarios, and is widely applicable.

In a possible design, the invoking the first camera to perform preview includes: when the shooting instruction is the first shooting instruction, invoking the first camera to perform preview at a first frame rate: or when the shooting instruction is the second shooting instruction, invoking the first camera to perform preview at a second frame rate. In the scenario in which the target moving object may move from one point to another point, the moving speed of the target moving object generally does not change significantly, and the FOV of the first camera is relatively large. Therefore, in this implementation scenario, the electronic device may control the first camera to perform preview at the first frame rate, and the first frame rate may be, for example, 30 fps. In the scenario in which the target moving object moves around from a central point in an explosive manner, the FOV of the first camera is relatively small, and the moving speed of the target moving object may be relatively fast initially. Therefore, in this implementation scenario, the electronic device may control the first camera to perform preview at the second frame rate, and the second frame rate is, for example, a highest frame rate supported by the first camera. It can be learned that, in the video shooting method in this application, preview can be performed by using a frame rate corresponding to a shooting scenario, and the video shooting method is widely applicable.

In a possible design, the determining a target shooting frame rate based on a moving speed of the target moving object includes: determining a best frame rate based on the moving speed of the target moving object; and determining, as the target shooting frame rate, a frame rate that is in frame rates supported by the second camera and that is adjacent to the best frame rate and greater than the best frame rate. The electronic device may determine the best frame rate based on the moving speed of the target moving object. Further, in some embodiments, the electronic device supports the best frame rate, and the electronic device may use the best frame rate as the target shooting frame rate. In some other embodiments, the electronic device does not support the best frame rate, and the electronic device includes only two cameras. The electronic device determines, as the target shooting frame rate, a frame rate that is in frame rates supported by the second camera and that is adjacent to the best frame rate and greater than the best frame rate. In this implementation, a best shooting effect can be ensured, thereby improving user experience.

In a possible design, the determining a target shooting frame rate based on a moving speed of the target moving object includes: determining a best frame rate based on the moving speed of the target moving object; calculating a difference between the best frame rate and each of frame rates supported by the second camera, to obtain one or more differences; determining whether a smallest difference is less than a first threshold, where the smallest difference belongs to the one or more differences, and the first threshold is a value obtained by multiplying a frame rate corresponding to the smallest difference by a preset percentage; and if the smallest difference is less than the first threshold, determining the frame rate corresponding to the smallest difference as the target shooting frame rate. If the electronic device does not support the best frame rate, and the electronic device includes a plurality of camera entities, the electronic device may determine the target shooting frame rate based on a difference between the best frame rate and each of frame rates supported by other cameras than the first camera, and then select one camera entity as the second camera. It should be noted that a smaller difference between frame rates indicates a better shooting effect corresponding to a shooting frame rate corresponding to the difference. Based on this, the electronic device may select the smallest difference from the one or more differences, and further, when the smallest difference is less than the value obtained by multiplying the frame rate corresponding to the smallest difference by the preset percentage, determine the frame rate corresponding to the smallest difference as the target shooting frame rate. In addition, the electronic device may further use a camera that supports the frame rate corresponding to the smallest difference as the second camera. In this implementation, a best shooting effect can be ensured, thereby improving user experience.

In a possible design, the determining a best frame rate based on the moving speed of the target moving object including: determining, according to $$T2 = \frac{L2}{\frac{L1}{T1}} = T1 * \frac{L2}{L1},$$

total duration T2 for which the target moving object passes through a shooting area of the second camera, where L1/L1 is the moving speed of the target moving object, T1 is first duration. L1 is a quantity of pixels by which the target moving object moves in the field of view of the first camera within the first duration, and L2 is a quantity of pixels of the shooting area of the second camera in a moving direction of the target moving object; and determining the best frame rate f according to $$f = k * \frac{1}{T1},$$

where k is an integer greater than 1. For example, k is 300. The moving speed of the target moving object may be represented as L1/T1. In some embodiments, the first duration may be preset duration. For example, the first duration is 0.05 seconds. In some other embodiments, the first duration may be a reciprocal of a frame rate used when the first camera performs preview. The electronic device can determine, according to $$T2 = \frac{L2}{\frac{L1}{T1}} = T1 * \frac{L2}{L1},$$

total duration for which the target moving object passes through the FOV of the second camera. To ensure that the to-be-invoked second camera can shoot at least one frame of image, a shooting frame rate of the to-be-invoked second camera needs to be at least greater than or equal to 1. Based on this, the best frame rate is:

$$f = k * \frac{1}{T2}.$$

this implementation, the electronic device can determine the best frame rate based on the moving speed of the target moving object during preview, and can further determine the target shooting frame rate. In this way, not only a degree of intelligence is high, but also a relatively suitable shooting frame rate can be determined, so that a shooting effect can be optimized.

In a possible design, if it is detected that the target moving object moves in the FOV of the first camera, the method further includes: determining one or more of the following parameters based on the moving speed of the target moving object: a moment of starting the second camera, a trigger location of starting the second camera, an exposure parameter of the second camera, and a focal length of the second camera, where the trigger location is a location to which the target moving object moves. In this implementation, the electronic device can start the second camera at a proper time based on the moving speed of the target moving object or the like, so that the second camera performs shooting by using a proper shooting parameter. In this way, when the target moving object enters a shooting area, it can be ensured that the second camera can capture the target moving object in a proper shooting mode, so that the electronic device does not need to cache several videos of a moment at which the target moving object enters a trigger area, thereby saving storage space.

In a possible design, when the invoking the second camera to shoot a video of the target moving object at the target shooting frame rate, the method further includes: invoking the first camera to shoot the video of the target moving object at a third shooting frame rate, where the third shooting frame rate is different from the target shooting frame rate. In this application, the user may enter an instruction for displaying a video on a plurality of screens to the electronic device. Further, when invoking the second camera to shoot the video of the target moving object, the electronic device may further invoke the first camera to shoot the video of the target moving object. A shooting frame rate of the first camera is different from the target shooting frame rate. In this implementation, the electronic device can simultaneously perform shooting by using at least two cameras, so that videos played at different moving speeds in a same shooting scenario can be obtained.

In a possible design, after the invoking the second camera to shoot a video of the target moving object at the target shooting frame rate, the method further includes: playing a first video file shot by the first camera and a second video file shot by the second camera, where a third shooting frame rate corresponding to the first video file is different from the target shooting frame rate corresponding to the second video file. In this application, the electronic device may play two video files. The two video files are shot in a same shooting scenario by using different shooting frame rates. The two video files are presented at different moving speeds. It can be learned that, in this implementation, the electronic device can simultaneously perform shooting by using at least two cameras, so that videos played at different moving speeds in a same shooting scenario can be obtained, thereby improving viewing experience of the user.

According to a second aspect, this application provides an electronic device. The electronic device has functions of implementing the foregoing method. The functions may be implemented by hardware, or may be implemented by executing corresponding software by hardware. The hardware or software includes one or more modules corresponding to the foregoing functions. In a possible design, a structure of the foregoing electronic device includes a processor and a memory, and the processor is configured to process the electronic device to implement a corresponding function in the foregoing method. The memory is configured to store program instructions and data that are necessary for the electronic device.

According to a third aspect, this application provides a computer storage medium. The computer storage medium stores instructions, and when the instructions are run on a computer, the computer is enabled to perform some or all of the steps of the video shooting method in the first aspect and the possible implementations of the first aspect.

According to a fourth aspect, this application provides a computer program product. When the computer program product is run on a computer, the computer is enabled to perform some or all of the steps of the video shooting method in the first aspect and the possible implementations of the first aspect.

In conclusion, in the implementations of this application, an electronic device including at least two cameras may use one of the at least two cameras to preview a target moving object. Then, the electronic device determines a shooting camera, a shooting frame rate of the shooting camera, a start moment, a focal length, an exposure parameter, and the like based on a moving parameter of the target moving object during preview, an attribute parameter of a preview camera, and the like, and then starts, based on the determined data, the shooting camera in the at least two cameras to shoot a slow motion video. In this way, not only a best shooting frame rate can be determined based on a moving speed of the target moving object, to achieve a high degree of intelligence, but also storage space can be saved, to optimize a shooting effect.

BRIEF DESCRIPTION OF DRAWINGS

FIG. 3A-2 is a schematic diagram of a second example GUI interface in a human-computer interaction scenario according to this application:

FIG. 3A-3 is a schematic diagram of a third example GUI interface in a human-computer interaction scenario according to this application:

FIG. 3A-4 is a schematic diagram of a fourth example GUI interface in a human-computer interaction scenario according to this application:

FIG. 3B-1 is a schematic diagram of a first example GUI interface in a video play scenario according to this application:

FIG. 3B-2 is a schematic diagram of a second example GUI interface in a video play scenario according to this application;

FIG. 3B-3 is a schematic diagram of a third example GUI interface in a video play scenario according to this application:

FIG. 3B-4 is a schematic diagram of a fourth example GUI interface in a video play scenario according to this application;

DESCRIPTION OF EMBODIMENTS

Figure 1A:
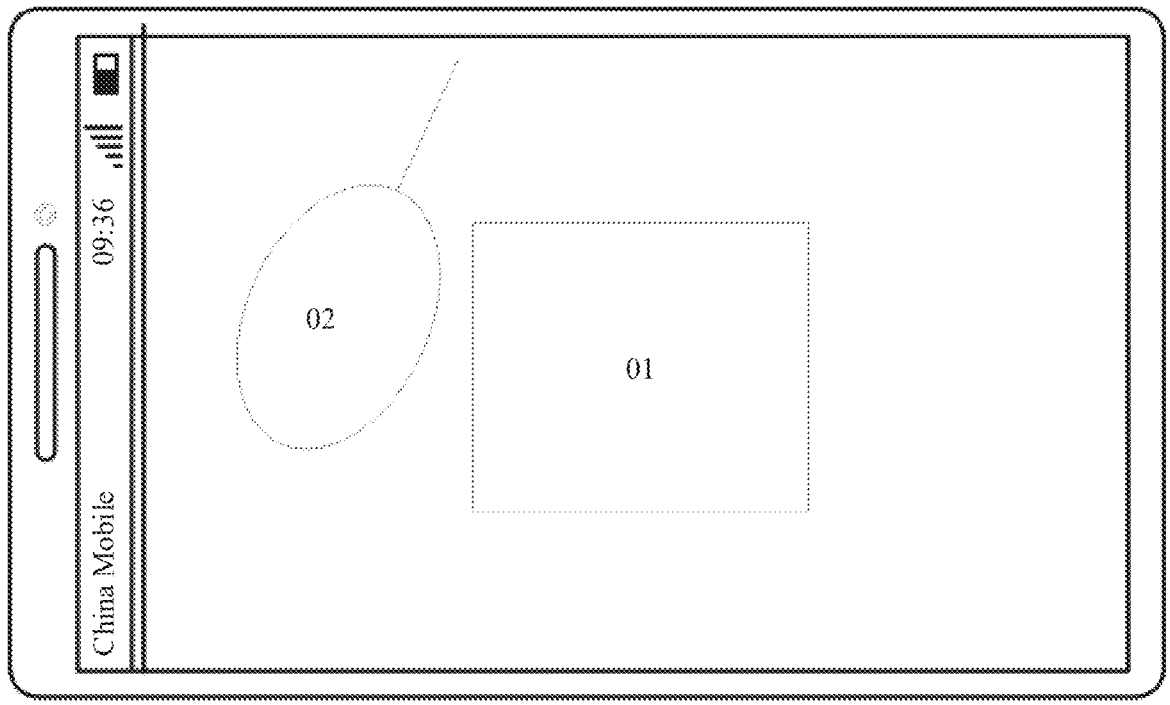
FIG. 1A is a first example schematic diagram of an existing graphical user interface (graphical user interface, GUI) according to this application.

The following clearly describes technical solutions of this application with reference to the accompanying drawings in this application.

Terms used in the following embodiments of this application are merely intended to describe specific embodiments, but are not intended to limit this application. As used in the specification and appended claims of this application, singular expressions "a", "one", "the", "the foregoing", "this", and "this one" are intended to also include plural expressions unless otherwise specified. It should be further understood that, although terms such as first and second may be used to describe an object of a type in the following embodiments, the object should not be limited to these terms. These terms are merely used to distinguish between specific objects of this type. For example, terms such as first and second may be used to describe a camera in the following embodiments, but the camera should not be limited to these terms. These terms are merely used to distinguish between different cameras of an electronic device. This goes the same when terms such as first and second are used in the following embodiments to describe an object of another type. Details are not described herein.

The following embodiments describe an electronic device and a video shooting method applied to the electronic device.

The electronic device in this application may be an electronic device that includes at least two cameras (camera), such as a mobile phone, a tablet computer, a monitoring device, or a vehicle-mounted device. The electronic device may be, for example, a device running iOS®, Android®, Microsoft®, or another operating system.

The at least two cameras in this application are different in a field of view (field of view, FOV), or a shooting direction, or both an FOV and a shooting direction. The FOV of the camera is a range of an area that can be captured by the camera. For example, the FOV of one of the at least two cameras is 120 degrees, and the FOV of the other camera is 60 degrees. For another example, the FOV of one of the at least two cameras is 150 degrees, and the shooting direction of the camera is 30 degrees to the left relative to a screen of the electronic device. The FOV of the other of the at least two cameras is 80 degrees, and the shooting direction of the camera is 30 degrees to the right relative to the screen of the electronic device. It should be understood that the foregoing examples are merely schematic descriptions of this application, and constitute no limitation on this application. Cameras of electronic devices of different brands or cameras of electronic devices of different models of a same brand may have different attributes such as FOVs and shooting directions. Details are not described herein.

A "user interface (user interface, UI)" used to display a video in this application is a media interface for interaction and information exchange between an application or an operating system and a user, and implements conversion between an internal form of information and an acceptable form of the user. A user interface for an application is source code written in specific computer language such as Java or extensible markup language (extensible markup language, XML). The interface source code is parsed and rendered on a terminal device, and finally presented as content that can be recognized by the user, for example, a control such as a video, a picture, a text, or a button A control (control) is also referred to as a widget (widget), and is a basic element of a user interface. Typical controls include a toolbar (toolbar), a menu bar (menu bar), a text box (text box), a button (button), a scroll bar (scrollbar), a picture, and a text. An attribute and content of the control in the interface are defined by using a label or a node. For example, XML specifies the control included in the interface by using a node such as <Textview>, <ImgView>, or <VideoView>. One node corresponds to one control or one attribute in the interface. After being parsed and rendered, the node is presented as content that is visible to the user. In addition, an interface for many applications such as a hybrid application (hybrid application) generally includes a web page. The web page is also referred to as a page, and may be understood as a special control embedded in an application interface. The web page is source code written in specific computer language, such as hypertext markup language (hypertext markup language, HTML), cascading style sheets (cascading style sheets. CSS), and JavaScript (JavaScript, JS). The source code as the web page may be loaded and displayed as recognizable content of a user by using a browser or a web page display component similar to a browser function. Specific content included in the web page is also defined by using a label or a node in the source code as the web page. For example, HTML defines an element and an attribute of the web page by using <p>, <img>, <video>, and <canvas>.

A common presentation form of the user interface is a graphical user interface (graphic user interface, GUI), which is a user interface that is displayed in a graphic form and that is related to a computer operation. The user interface may be an interface element such as an icon, a window, or a control that is displayed on a display of an electronic device. The control may include a visible interface element such as an icon, a button, a menu, a tab, a text box, a dialog box, a status bar, a navigation bar, and a widget.

A "frame rate (frame rate)" in this application may also be referred to as a "frame rate" or a "frame rate", and is a frequency (rate) at which a bitmap image is continuously played or captured in units of a frame. The frame rate may be represented by frames per second (frames per second, fps). For example, a frame rate at which a camera captures an image may be referred to as a shooting frame rate. One camera may support a plurality of shooting frame rates, such as 30 fps, 90 fps. 120 fps, and 480 fps. Shooting frame rates supported by different cameras may be different. A play frame rate of the electronic device is usually fixed, for example, 30 fps.

Figure 1B:
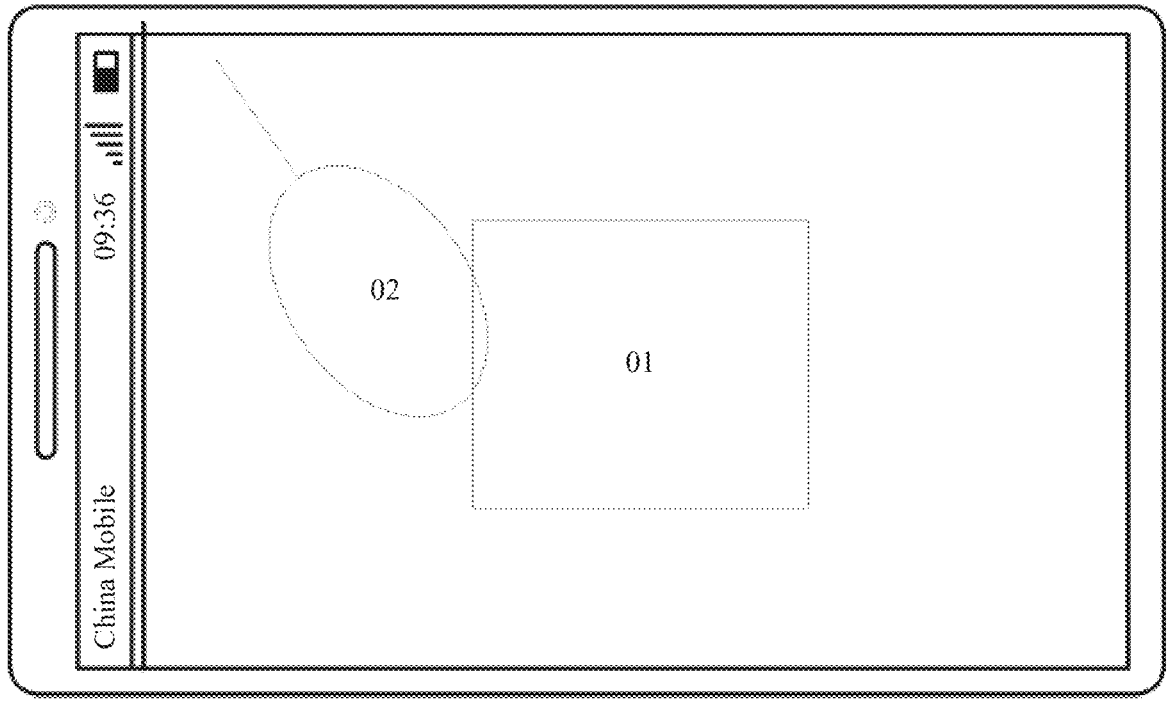
FIG. 1B is a second example schematic diagram of an existing GUI according to this application.

In a typical video shooting method, the electronic device invokes one camera. As shown in FIG. 1A, the user preset a shooting frame rate (not shown in the figure) and manually sets an area 01, where the area 01 is used to trigger slow motion video shooting. As shown in FIG. 1B, after detecting that a moving object 02 enters the area 01, the electronic device shoots the moving object 02 at the frame rate preset by the user, to obtain a slow motion video of the moving object 02. In this manner, a shooting frame rate and a trigger area need to be manually set by the user, and a degree of intelligence is low. In addition, if a moving speed of the moving object is relatively fast, the electronic device cannot recognize the moving object in time, resulting in incorrect focusing and a poor shooting effect. Moreover, to ensure that the electronic device can capture the moving object a moment at which the moving object enters the trigger area, the electronic device needs to cache several videos of the moment at which the moving object enters the trigger area, and consequently relatively large storage space needs to be occupied.

This application provides a video shooting method and an electronic device, and the electronic device includes at least two cameras. In a possible implementation, both of the at least two cameras may be rear-facing cameras of the electronic device. In another possible implementation, both of the at least two cameras may be front-facing cameras of the electronic device. In still another possible implementation, the at least two cameras may include a front-facing camera of the electronic device and a rear-facing camera of the electronic device. Further, during shooting, the electronic device may invoke one of the at least two cameras to perform preview. After a moving object enters an FOV of the preview camera, the electronic device determines a shooting frame rate based on a moving speed of the moving object. Then, the electronic device invokes the other of the at least two cameras to shoot a video of the moving object at the determined shooting frame rate. In this way, not only a degree of intelligence is high, but also a relatively suitable shooting frame rate can be determined, so that a shooting effect can be optimized, and user experience can be improved.

An example electronic device 100 provided in the following embodiments of this application is first described.

Figure 2A:
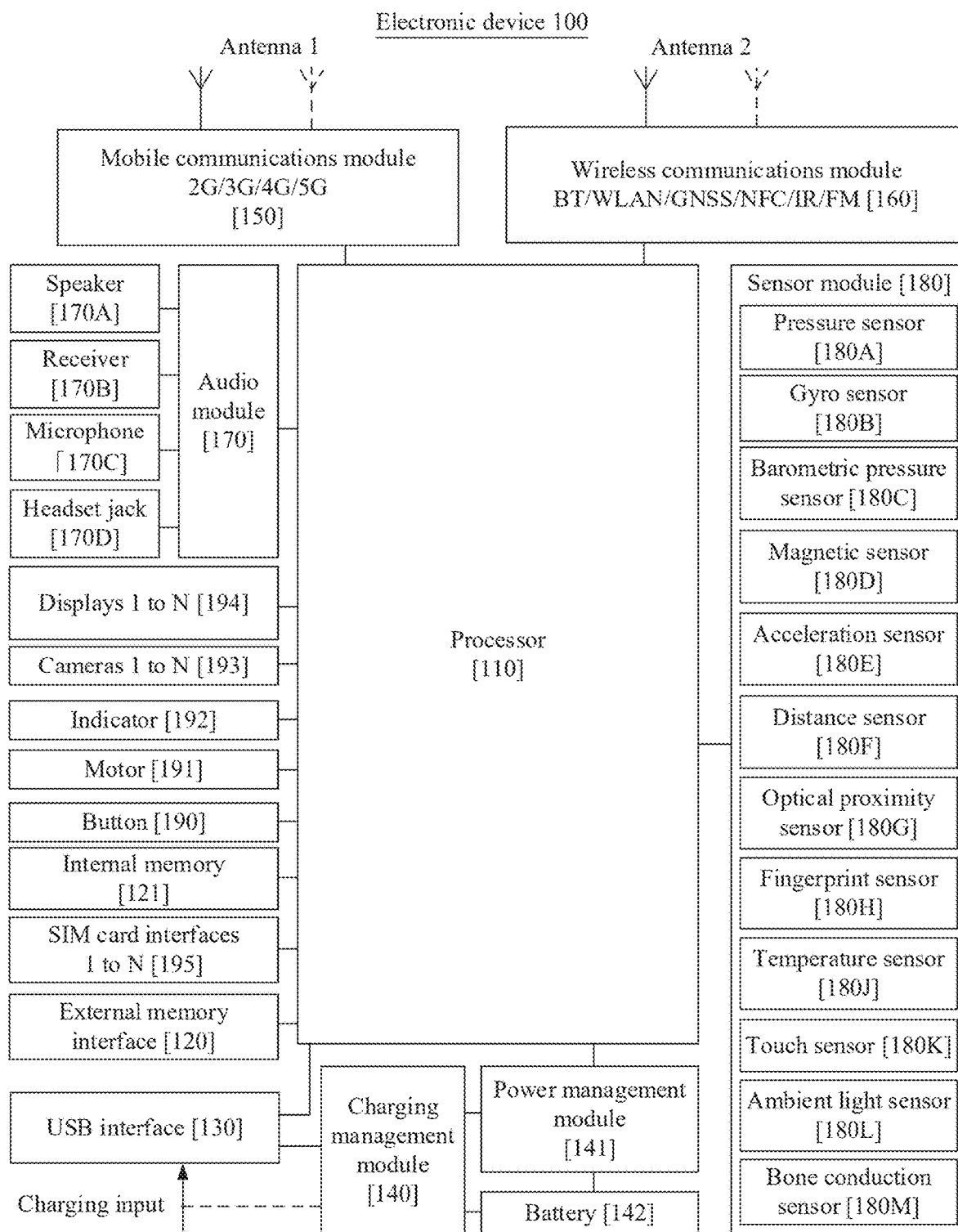
FIG. 2A is a schematic diagram of an example hardware structure of an electronic device 100 according to this application.

FIG. 2A is a schematic diagram of a structure of an electronic device 100.

The electronic device 100 may include a processor 110, an external memory interface 120, an internal memory 121, a universal serial bus (universal serial bus. USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this application does not constitute a specific limitation on the electronic device 100. In some other embodiments of this application, the electronic device 100 may include more or fewer components than those shown in the figure, or some components may be combined, or some components may be split, or different component arrangements may be used. The components shown may be implemented by hardware, software, or a combination of software and hardware.

The processor 110 may include one or more processing units. For example, the processor 110 may include an application processor (application processor, AP), a modem processor, a graphics processing unit (graphics processing unit. GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. In some embodiments, the electronic device 100 may also include one or more processors 110.

The controller may be a nerve center and a command center of the electronic device 100. The controller may generate an operation control signal based on an instruction operation code and a time sequence signal, to complete control of instruction detection and the like.

A memory may be further disposed in the processor 110, and is configured to store instructions and data. In some embodiments, the memory in the processor 110 is a cache memory. The memory may store instructions or data just used or used cyclically by the processor 110. If the processor 110 needs to use the instructions or the data again, the processor 110 may directly invoke the instructions or the data from the memory, to avoid repeated access, and reduce a waiting time of the processor 110, thereby improving efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through the PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through UART interface, to implement a function of playing music by using a Bluetooth headset.

The MIPI interface may be configured to connect the processor 110 to a peripheral component such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to transmit data between the electronic device 100 and a peripheral device, or may be configured to connect to a headset and play audio by using the headset. The interface may be further configured to connect to another electronic device such as an AR device.

It may be understood that an interface connection relationship between the modules that is shown in this application is merely an example for description, and does not constitute a limitation on a structure of the electronic device 100. In some other embodiments, the electronic device 100 may alternatively use an interface connection manner different from that in the foregoing embodiment, or a combinations of a plurality of interface connection manners.

The charging management module 140 is configured to receive a charging input from the charger. The charger may be a wireless charger, or may be a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, an external memory, the display 194, the camera 193, and the wireless communications module 160. The power management module 141 may further monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G/3G/4G/5G and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication. NFC), an infrared (infrared. IR) technology, and the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access. TD-CDMA), long term evolution (long term evolution. LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system. QZSS), and/or a satellite based augmentation system (satellite based augmentation system, SBAS).

In some embodiments, the solution to wireless communication provided by the mobile communications module 150 may enable the electronic device to communicate with a device (for example, a cloud server) in the network, and the solution to WLAN wireless communication provided by the wireless communications module 160 may also enable the electronic device to communicate with a device (for example, a cloud server) in the network. In this way, the electronic device may perform data transmission with the cloud server.

The electronic device 100 may implement a display function through the display 194, the application processor, and the like. The display 194 is configured to display a control, information, a video, an image, and the like. For example, the display 194 may display a camera control, and the camera control is configured to receive an instruction of a user to enable a photographing function of the camera 193. The display 194 includes a display panel. The display panel may be a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flexible light-emitting diode. FLED), a Miniled, a MicroLed, a Micro-oLed, a quantum dot light emitting diode (quantum dot light emitting diode, QLED), or the like.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An object generates an optical image through the lens and projects the optical image to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include at least two camera entities.

The digital signal processor is configured to process a digital signal. In addition to a digital image signal, the digital signal processor may also process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external storage card, such as a micro SD card, to extend a storage capability of the electronic device 100. The external storage card communicates with the processor 110 through the external memory interface 120, to implement a data storage function. For example, data such as music, a photo, and a video is stored in the external storage card.

The internal memory 121 may be configured to store one or more computer programs, and the one or more computer programs include instructions. The processor 110 may run the foregoing instructions stored in the internal memory 121, so that the electronic device 100 performs a video shooting method, various functional applications, data processing, and the like provided in some embodiments of this application. The internal memory 121 may include a program storage area and a data storage area. The program storage area may store an operating system. The program storage area may further store one or more applications (such as Gallery or Contacts) The data storage area may store data created in a use process of the electronic device 100. In addition, the internal memory 121 may include a high-speed random access memory, and may further include a non-volatile memory, such as at least one disk storage device, a flash memory, or a universal flash storage (universal flash storage, UFS).

The electronic device 100 may implement an audio function such as music play or recording through the audio module 170, the speaker 170A, the receiver 170B, the microphone 170C, the headset jack 170D, an application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When the electronic device 100 is used to answer a call or listen to voice information, the receiver 170B may be put close to a human ear to listen to a voice.

The microphone 170C, also referred to as a "mike" or a "microphone", is configured to convert a sound signal into an electrical signal. When making a call or sending a voice message, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, and calculates, based on the angle, a distance for which a lens module needs to be compensated, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip over based on the magnetic sensor 180D. Further, a feature such as automatic unlocking upon opening of the flip cover is set based on a detected opening or closing state of the flip cover.

The acceleration sensor 180E may detect magnitude of acceleration in various directions (generally on three axes) of the electronic device 100, and may detect magnitude and a direction of the gravity when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K may also be referred to as a touch panel or a touch-sensitive surface. The touch sensor 180K may be disposed on the display 194, and the touch sensor 180K and the display 194 form a touchscreen, which is also referred to as a "touchscreen". The touch sensor 180K is configured to detect a touch operation on or near the touch sensor 180K. The touch sensor may transfer the detected touch operation to the application processor to determine a touch event type. A visual output related to the touch operation may be provided by the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a human pulse to receive a blood pressure beating signal. In some embodiments, the bone conduction sensor 180M may alternatively be disposed in the headset, to obtain a bone conduction headset. The audio module 170 may parse out a speech signal through parsing based on the vibration signal that is of the vibration bone of the human vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio play) may correspond to different vibration feedback effects. The motor 191 may also correspond to different vibration feedback effects for touch operations on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may be further compatible with an external storage card. The electronic device 100 interacts with a network by using the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The electronic device 100 shown in FIG. 2A may implement, by using the camera 193, a video shooting function described in the following embodiments. The electronic device 100 may display, by using the display 194, various shooting areas described in the following embodiments, and the like.

A software system of the electronic device 100 may use a layered architecture, an event-driven architecture, a micro-kernel architecture, a micro service architecture, or a cloud architecture. In this application, an Android system of a layered architecture is used as an example to describe a software structure of the electronic device 100.

Figure 2B:
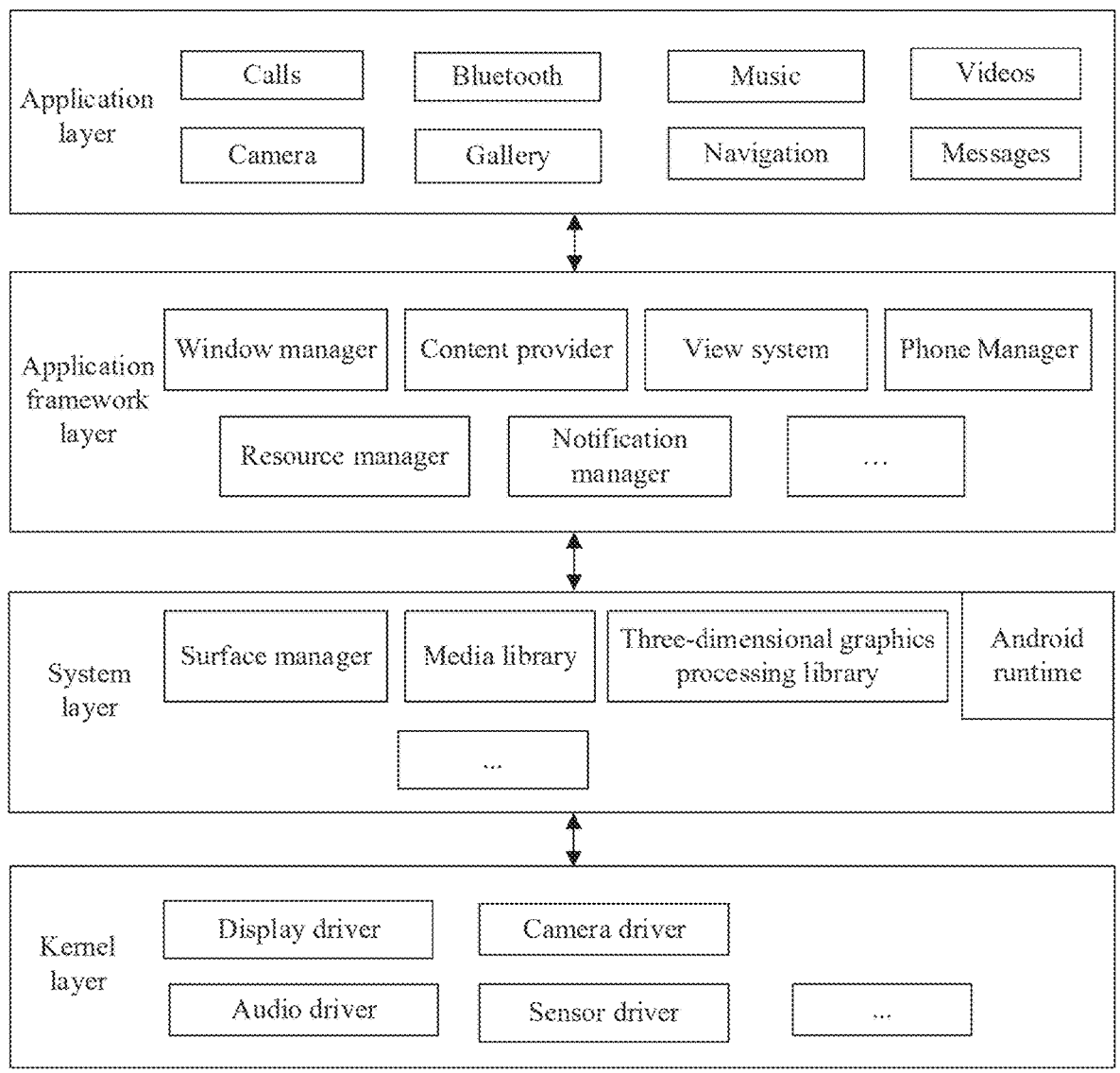
FIG. 2B is a schematic diagram of an example software architecture of an electronic device 100 according to this application.

FIG. 2B is a block diagram of the software structure of the electronic device 100 according to this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and a system library, and a kernel layer from top to bottom. The application layer may include a series of application packages.

As shown in FIG. 2B, the application package may include applications such as Camera, Gallery. Calls. Navigation, Bluetooth. Music, Videos, and Messages.

The application framework layer provides an application programming interface (application programming interface. API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, obtain parameters of various display areas on a display interface, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying text, a control for displaying an image, and the like. The view system may be configured to construct an application. A display interface may include one or more views. For example, the display interface includes a Camera icon.

The phone manager is configured to provide a communication function for the electronic device 100, for example, management of a call status (including answering and declining).

The resource manager provides an application with various resources such as a localized character string, an icon, an image, a layout file, and a video file.

The notification manager enables an application to display notification information in a status bar, and may be configured to convey a notification message. The notification message may automatically disappear after a short pause without requiring a user interaction. For example, the notification manager is configured to notify download completion, and give a message notification. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is made, the electronic device vibrates, or an indicator light blinks.

The Android runtime includes a core library and a virtual machine. The Android runtime is responsible for scheduling and management of the Android system. The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports play and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 2B relates to a program (such as a core library) for invoking a camera, an application module (such as a window manager) for displaying a video picture, an application framework, a display driver, and the like.

The following describes an example of a user operation process in this application with reference to a GUI of the electronic device 100 from a perspective of human-computer interaction. The GUI may be displayed on the display 194 shown in FIG. 2A.

For example, a smartphone is used as an example. For example, the smartphone is provided with two cameras, and both of the two cameras are rear-facing cameras of the smartphone. FOVs of the two cameras are different. For example, a Camera application (application, APP) is installed in the smartphone.

Figures 1, 3A:
FIG. 3A-1 is a schematic diagram of a first example GUI interface in a human-computer interaction scenario according to this application.

As shown in FIG. 3A-1, a main interface GUI of the smartphone displays icon elements such as Camera 31. Calculator 32, Music 33, Clock 34, Contacts 35, Messages 36, Settings 37, and Browser 38, and interface elements such as Navigation Bar and Date and Time. Camera 31 is an interface icon corresponding to the camera APP, and a user taps the camera 31 to trigger running of the camera APP. After receiving the tap operation of the user, the smartphone can receive an instruction for running the camera APP corresponding to the tap operation. Further, the smartphone runs the camera APP. Correspondingly, the GUI is updated to a shooting interface shown in FIG. 3A-2.

Figures 2, 3A:
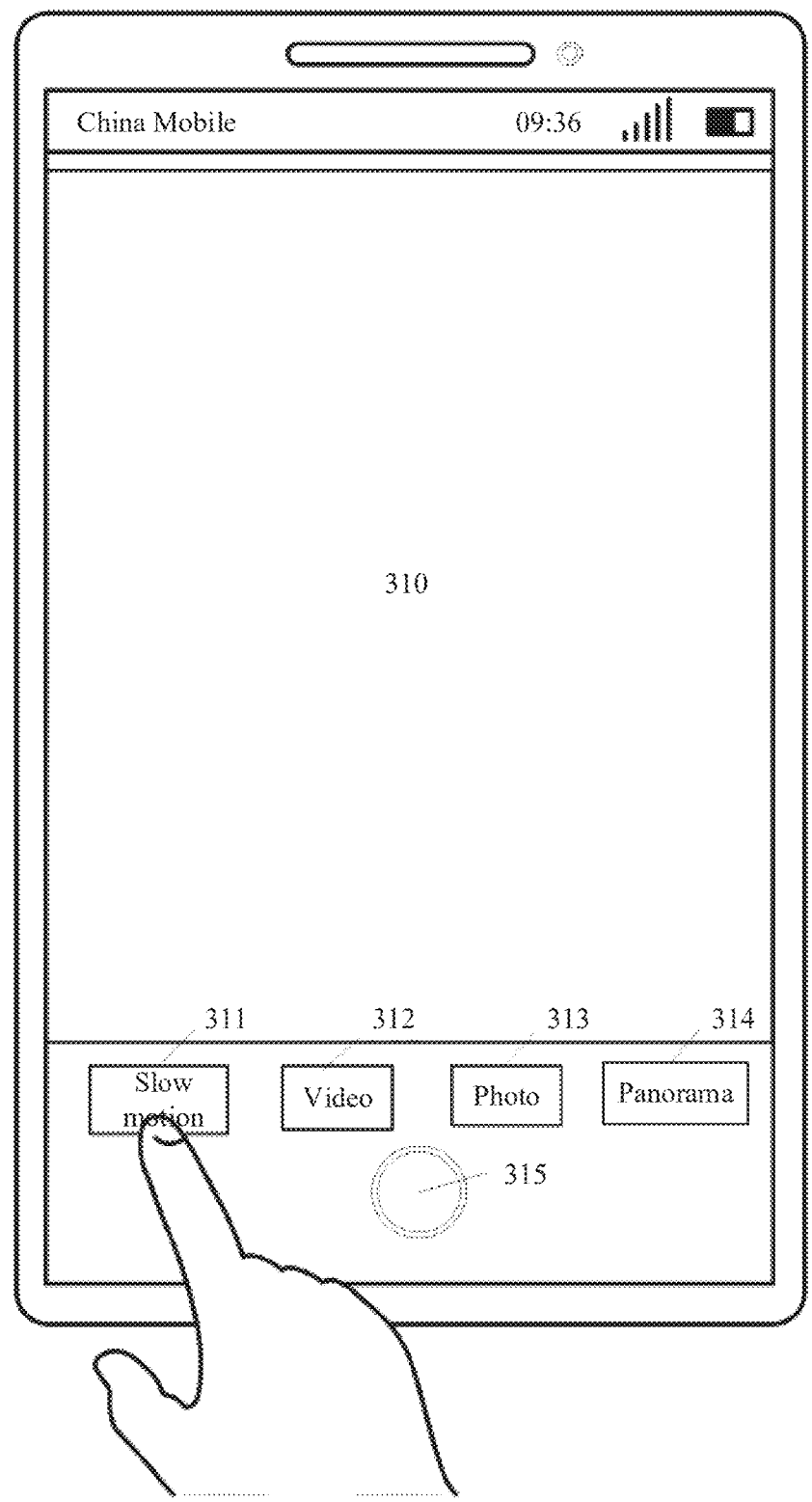

As shown in FIG. 3A-2, a GUI corresponding to the shooting interface includes interface elements such as a viewfinder 310, Slow Motion 311. Video 312, Photo 313, Panorama 314, and a shooting trigger button 315. The viewfinder 310 is used to display an obtained shot object to the user. In embodiments, Viewfinder 310 is, for example, an FOV of a camera that is used to shoot a slow motion video. For example. Slow Motion 311. Video 312. Photo 313, and Panorama 314 correspond to shooting modes supported by the smartphone. The user triggers different shooting modes, and the smartphone receives an instruction for performing shooting according to a corresponding mode. After performing shooting, the smartphone can present videos or images with different imaging effects. For example, the smartphone can shoot a slow motion video of a shot object in the shooting mode corresponding to Slow Motion 311. The smartphone can shoot a video of a shot object in the shooting mode corresponding to Video 312. A moving speed of the shot object in the video is the same as an actual moving speed of the shot object. The smartphone can shoot an image of a shot object in the shooting mode corresponding to Photo 313.

The smartphone can shoot a panoramic image of a shot environment in the shooting mode corresponding to Panorama 314. The shooting trigger button 315 is used to trigger the smartphone to start a shooting operation. In embodiments, the user may tap Slow Motion 311 in the GUI shown in FIG. 3A-2, to trigger the smartphone to perform shooting in the shooting mode of shooting the slow motion video.

It should be noted that, during actual implementation, there are various scenarios in which a user wants to shoot a slow motion video, and moving tracks of a target moving object in different scenarios are different. For example, in a scenario 1, the target moving object moves, for example, from one point to another point, for example, a moving track of a traveling train or a moving track after a bullet is shot. In a scenario 2, the target moving object moves around, for example, from a central point in an explosive manner, for example, moving tracks of fireworks during blooming. Based on this, to obtain a relatively good shooting effect, the smartphone may set an entrance for shooting scenarios of different nature, to trigger the smartphone to perform different scheduling on the two cameras of the smartphone in different scenarios. Based on this, after receiving an instruction entered by the user in the scenario shown in FIG. 3A-2, the smartphone may display an option of selecting a scenario on the display. Correspondingly, the GUI is updated to an interface shown in FIG. 3A-3.

Figures 3, 3A:
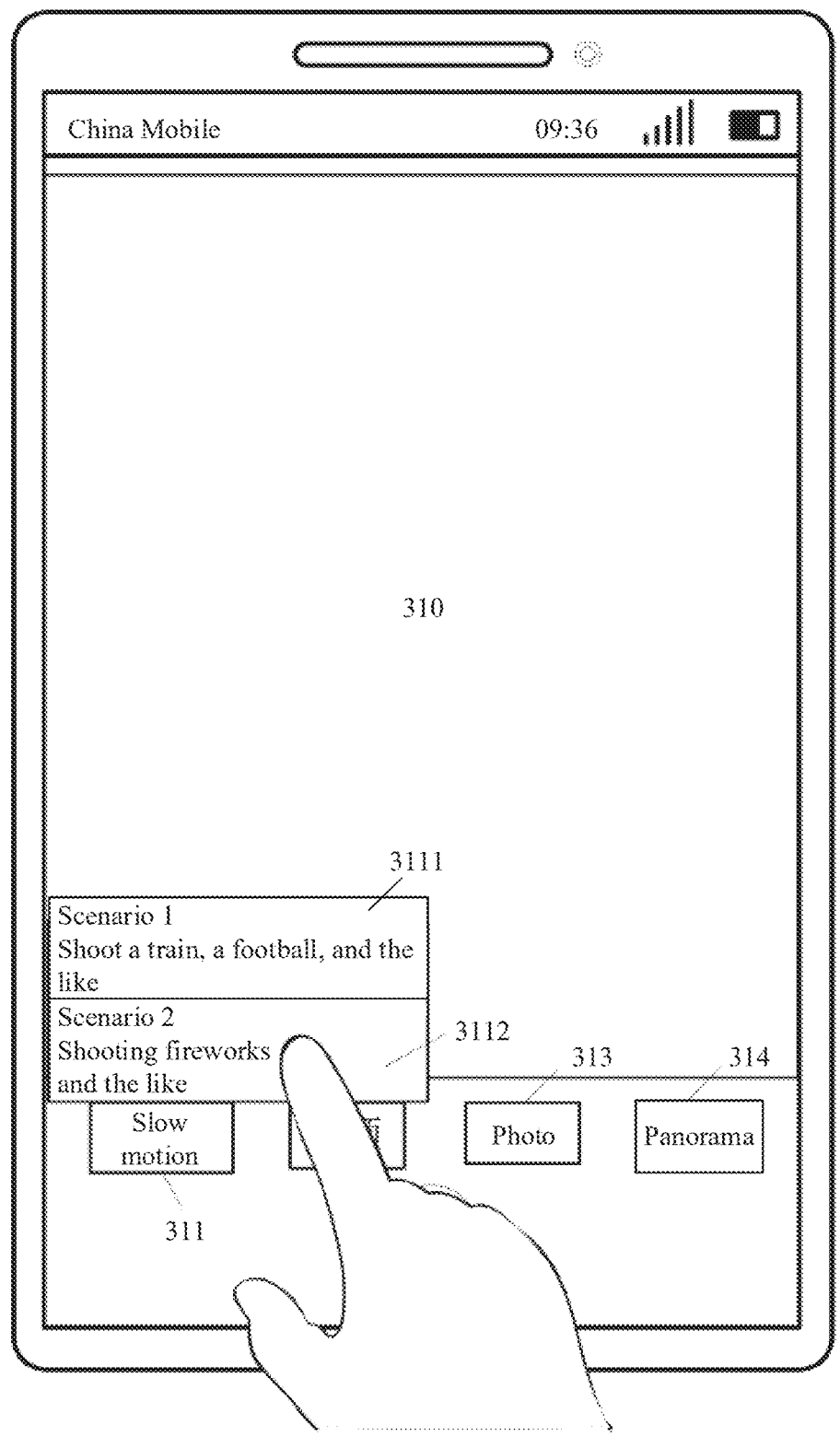

As shown in FIG. 3A-3, a pull-up menu is displayed near Slow Motion 311 in the GUI, and the pull-up menu includes an option 3111 and an option 3112. Content of the option 3111 is, for example, "scenario 1" and a prompt text of the scenario 1 "shooting a train, a football, a bird, and the like". Content of the option 3112 is, for example, "scenario 2" and a prompt text of the scenario 2 "shooting fireworks". For example, the user selects "option 3111". After receiving the option entered by the user, the smartphone hides the pull-up menu. Then, the GUI is updated to an interface shown in FIG. 3A-4.

The GUI shown in FIG. 3A-3 is merely an example display interface, and this application is not limited thereto. In other embodiments, the option 3111 and the option 3112 may alternatively be displayed in a drop-down menu.

Figures 3, 3A, 4:
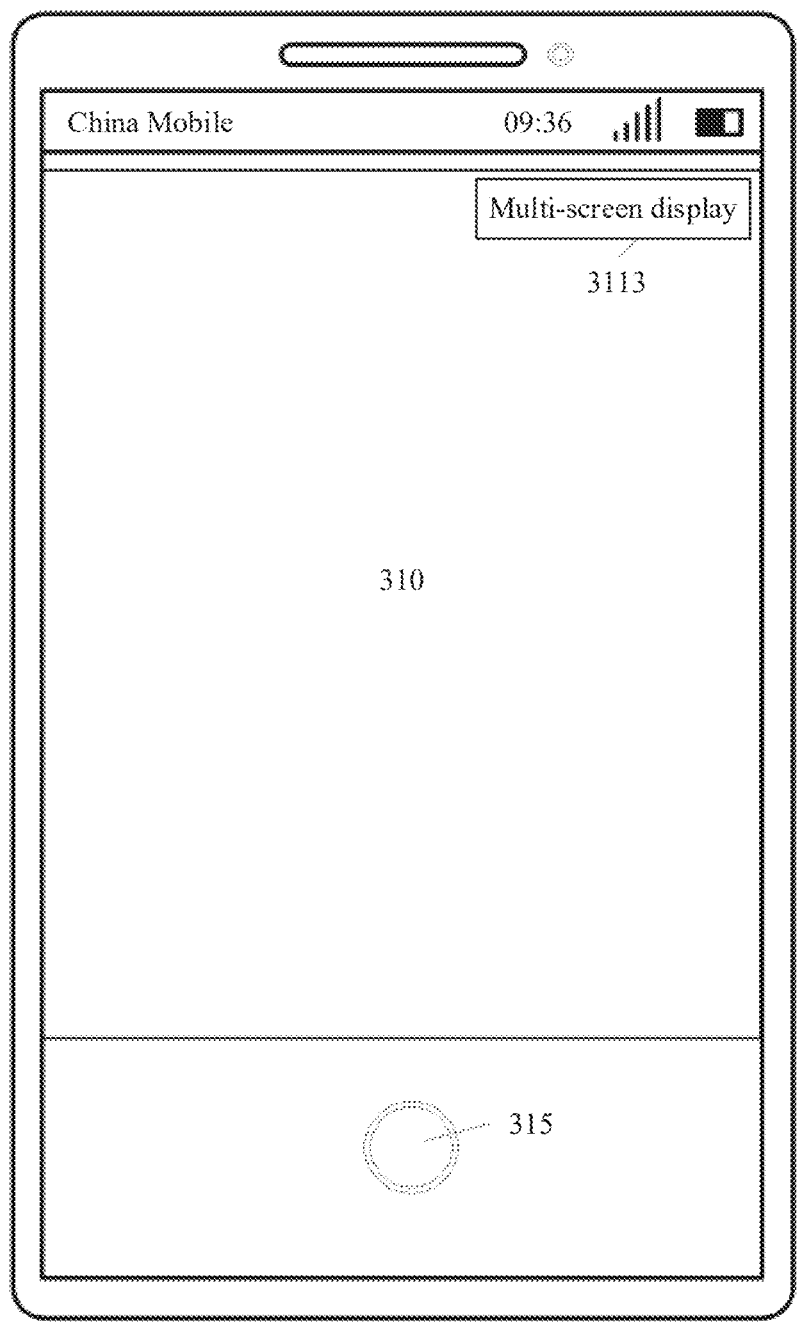

The GUI shown in FIG. 3A-4 includes a viewfinder 310, a shooting trigger button 315, and an option 3113. Content of the option 3113 is, for example, multi-screen display Functions of the viewfinder 310 and the shooting trigger button 315 are described in the scenario shown in FIG. 3A-2. Details are not described herein again. The user can trigger the option 3113 as required. After learning that the user selects the option 3113, the smartphone may control a color of "multi-screen display" to change to a color different from that displayed before the option 3113 is selected. For example, before the option 3113 is selected by the user, the color of "multi-screen display" is displayed in white, and after the option 3113 is selected by the user, the color of "multi-screen display" is displayed in yellow. Then, the user may tap the shooting trigger button 315. Correspondingly, after receiving an instruction for starting shooting entered by the user, the smartphone shoots a slow motion video in a shooting mode that matches the scenario 1 in FIG. 3A-3. For details of embodiments related to a shooting process, refer to the following descriptions in this specification. Details are not described herein.

Further, in some embodiments, the user does not perform the selection operation in FIG. 3A-4. After shooting is completed, the smartphone may receive a preview instruction or a play instruction that is tapped by the user, and then play a shot slow motion video on the display. In some other embodiments, the user has performed the selection operation in FIG. 3A-4. After shooting is completed, the smartphone may receive a preview instruction or a play instruction that is tapped by the user, and then play two slow motion videos on the display. The two slow motion videos are slow motion videos of a same target moving object shot by the user. Shooting frame rates of the two slow motion videos are different, and therefore presented moving speeds of the moving object are different. For example, a presentation effect of the two slow motion videos is shown in FIG. 3B-1 or FIG. 3B-2.

Figures 1, 3B:
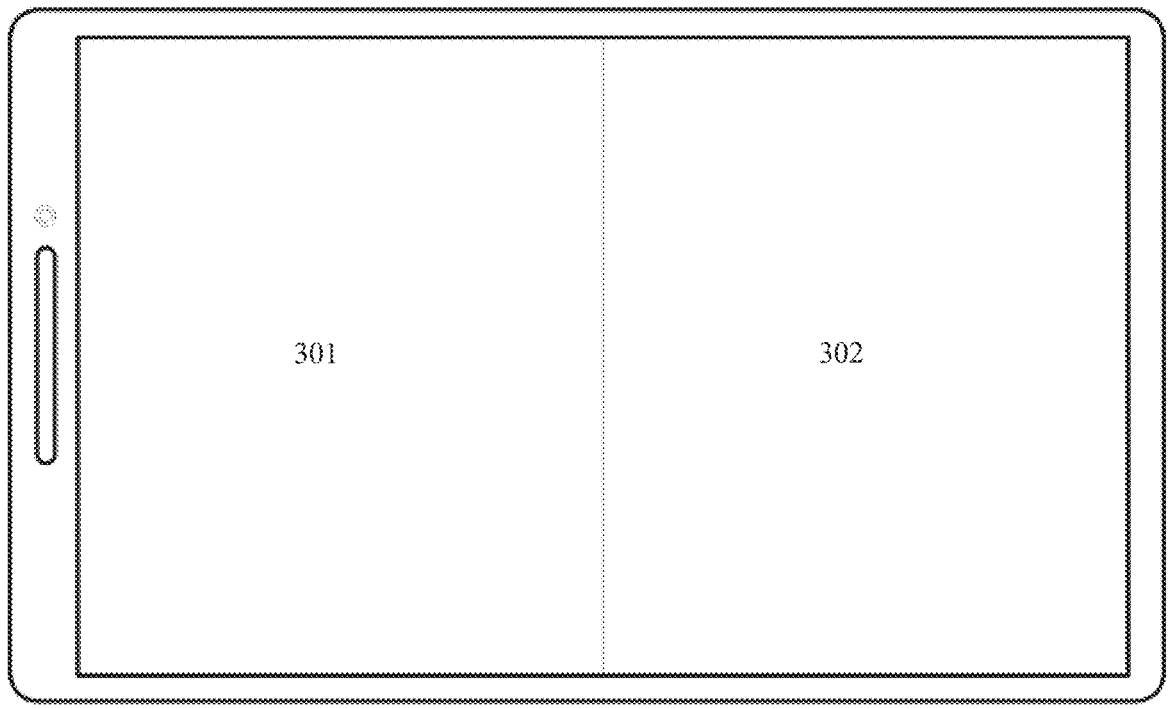
Figures 2, 3B:
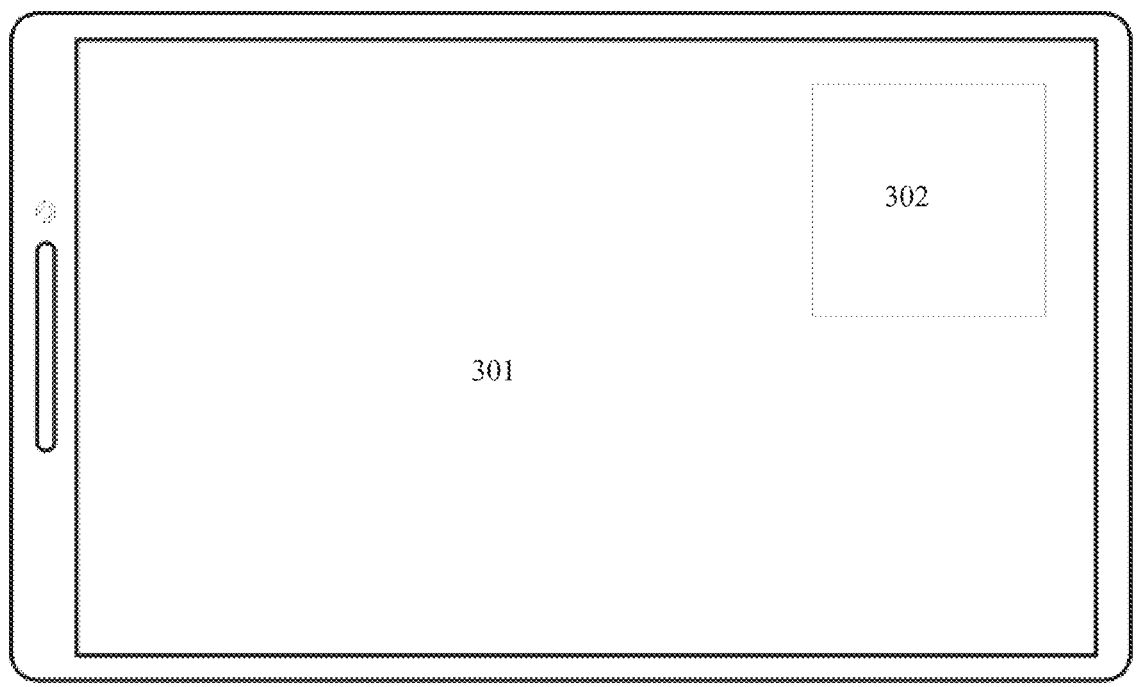
Figures 3, 3B:
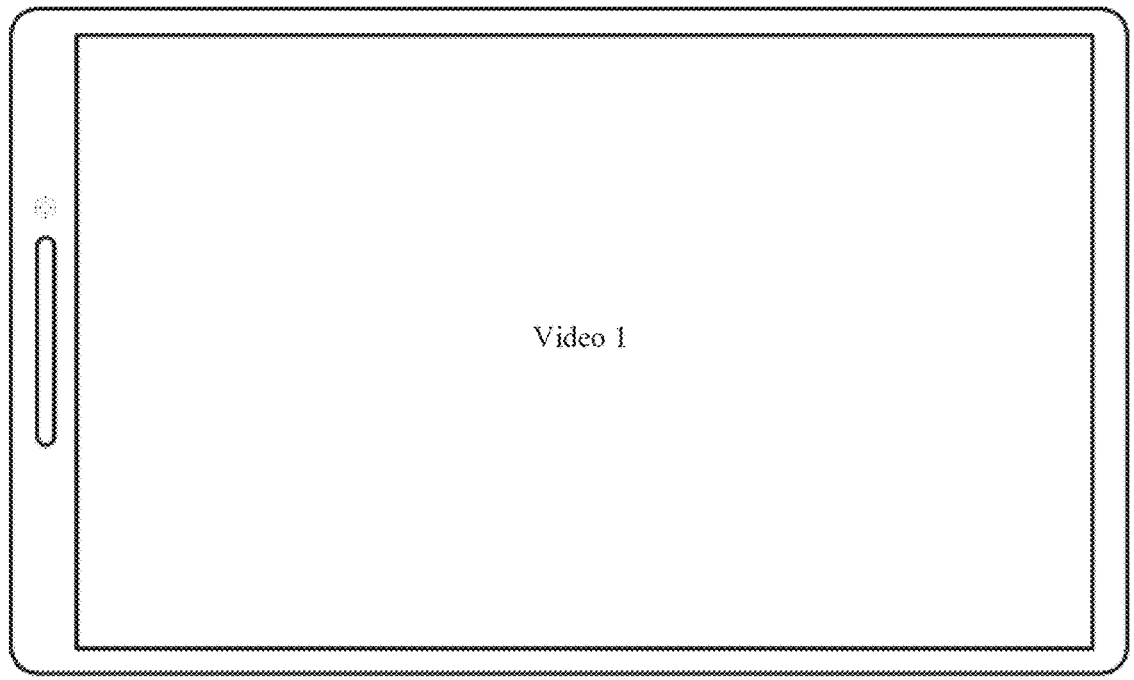
Figures 3, 3B, 4:
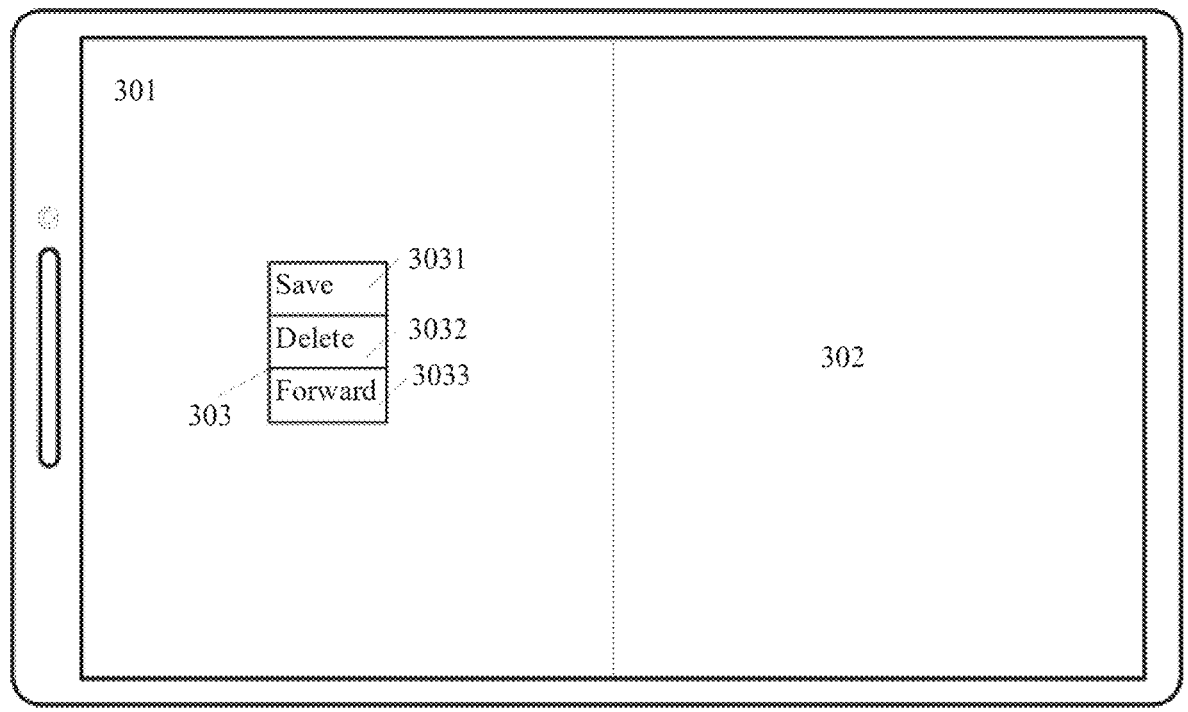

A GUI shown in FIG. 3B-1 includes a play interface 301 of a video 1 and a play interface 302 of the video 1. The play interface 301 and the play interface 302 each occupy half of a screen of the smartphone.

A GUI shown in FIG. 3B-2 includes a play interface 301 of a video 1 and a play interface 302 of the video 1. The play interface 301 occupies a full screen of the smartphone. The play interface 302 is embedded in the play interface 301, and is in front of the play interface 301.

Further, the user may perform an operation on any video shown in FIG. 3B-1 or any video shown in FIG. 3B-2. For example, the user may trigger full-screen play of any video through a double-tap operation. The user may further perform an operation such as saving or deletion on any video.

In some embodiments, the embodiment shown in FIG. 3B-1 is used as an example. After the user double-taps the video 1 shown in FIG. 3B-1, the smartphone receives a double-tap operation instruction entered by the user. Further, the smartphone may detect that a video corresponding to the double-tap operation instruction is the video 1. Then, the smartphone hides the play interface of the video 2 to control full-screen play of the video 1. Correspondingly, the GUI of the smartphone is updated to an interface shown in FIG. 3B-3.

In some other embodiments, the embodiment shown in FIG. 3B-1 is used as an example. After the user touches and holds the video 1 shown in FIG. 3B-1, the smartphone receives a touch-and-hold operation instruction entered by the user. Then, the smartphone displays an operation menu in a play area of the video 1 in response to the touch-and-hold operation instruction. Correspondingly, the GUI of the smartphone is updated to an interface shown in FIG. 3B-4.

The GUI shown in FIG. 3B-4 includes a play interface 301 of a video 1, a play interface 302 of the video 1, and an operation menu 303. The operation menu 303 is displayed in the play interface 301 of the video 1. The operation menu 303 includes an option 3031, an option 3032, and an option 3033. For example, content of the option 3031 is saved. For example, content of the option 3032 is deleted. For example, content of the option 3033 is forwarded. After the user taps the option 3031, the smartphone receives a saving instruction, and the saving instruction corresponds to the video 1. Further, the smartphone saves the video.

It should be noted that, if the user taps the option 3032 or the option 3033, the smartphone can execute a corresponding operation in response to a corresponding operation instruction. Details are not described herein.

It may be understood that the foregoing human-computer interaction process in which an operation is performed on the video is described by using the embodiment shown in FIG. 3B-1 as an example. In some other embodiments, a human-computer interaction process in which the user performs an operation on the video in FIG. 3B-2 is similar to that in the foregoing embodiment. Details are not described herein.

It may be understood that FIG. 3A-1 to FIG. 3B-4 are merely example descriptions, and embodiments of this application are not limited thereto. In some other embodiments, the electronic device 100 may receive a shooting instruction by using a video APP. In addition, display content and a display effect that the user views on the interface may vary with a system run on the smartphone, a device brand, a device model, and the like. Details are not described herein.

It can be learned that, in this implementation, the user does not need to manually set a shooting frame rate and a shooting area to achieve a relatively good shooting effect, so that user experience is better.

The following describes an example of a video shooting method in this application from a perspective of the electronic device 100. The video shooting method in this application is applied to the electronic device 100. The electronic device 100 includes at least two cameras. Each of the at least two cameras is the camera 193 shown in FIG. 2A. For example, the following uses two cameras as examples for description.

Figure 4A:
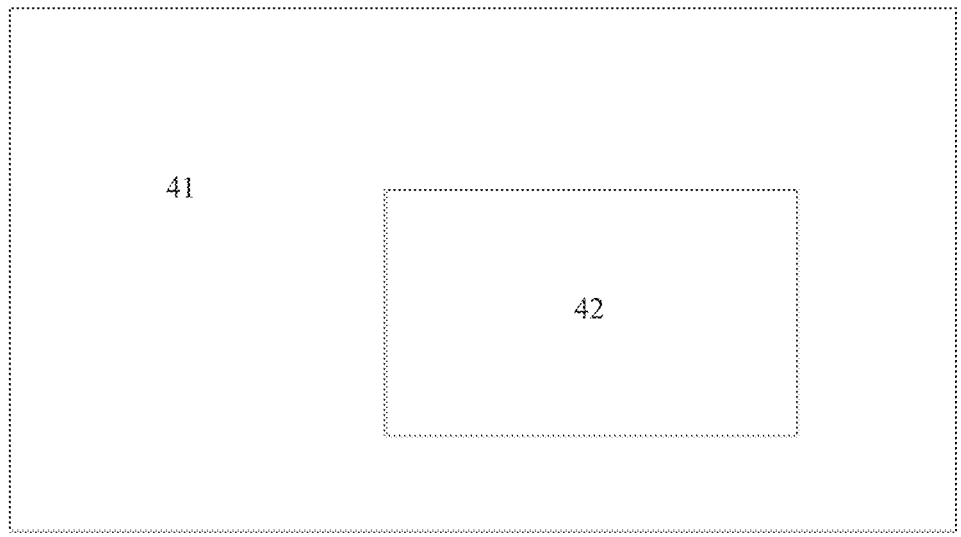
FIG. 4A is a schematic diagram of a first example scenario of a field of view (field of view, FOV) relationship between a first camera and a second camera according to this application.

It may be learned from the foregoing descriptions of the camera that the two cameras are different in at least one of an FOV and a shooting direction. Based on this, a relationship between FOV areas of the two cameras may include the following several cases:

In some embodiments, the two cameras are disposed at a same location of the electronic device 100. For example, both of the two cameras are disposed as front-facing cameras or rear-facing cameras. The shooting directions of the two cameras are the same, but the FOVs of the two cameras are different. In embodiments, an FOV area of a camera with a smaller FOV in the two cameras is completely within a range of an FOV area of a camera with a larger FOV. As shown in FIG. 4A, an FOV area 41 is an FOV area range of one of the two cameras, an FOV area 42 is an FOV area range of the other of the two cameras, and the FOV area 42 is completely within a range of the FOV area 41.

Figure 4B:
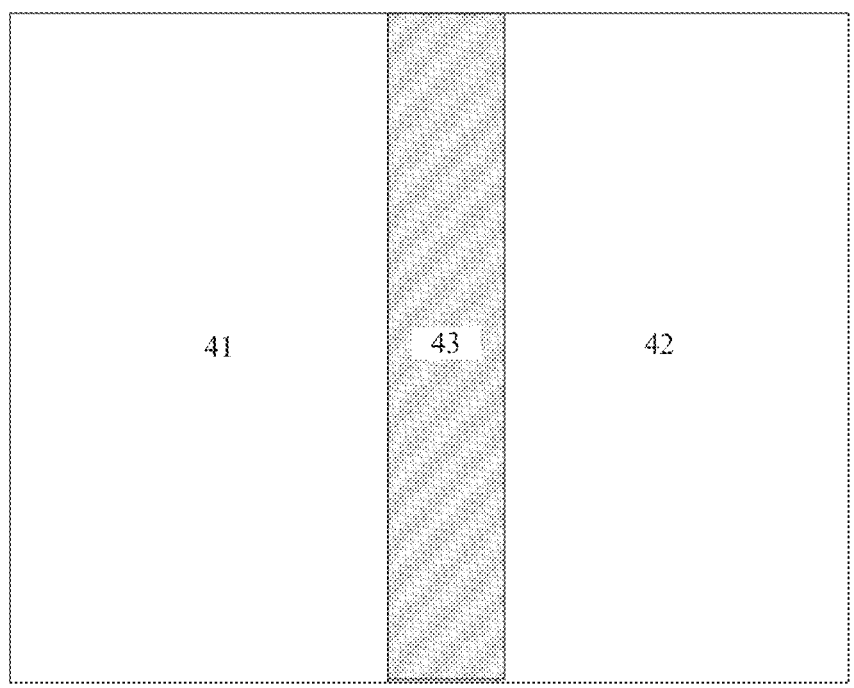
FIG. 4B is a schematic diagram of a second example scenario of an FOV relationship between a first camera and a second camera according to this application.

In some other embodiments, the two cameras are disposed at a same location of the electronic device 100, but the shooting directions of the two cameras are different. For example, one of the two cameras faces 60 degrees to the left of the electronic device 100, and the other camera faces 60 degrees to the right of the electronic device 100. In embodiments, regardless of whether the FOVs of the two cameras are the same, FOV areas of the two cameras partially overlap. As shown in FIG. 4B, an FOV area 41 is an FOV area range of one of the two cameras, an FOV area 42 is an FOV area range of the other of the two cameras, and a shadow part 43 is a part in which the FOV area 41 overlaps the FOV area 42.

Figure 4C:
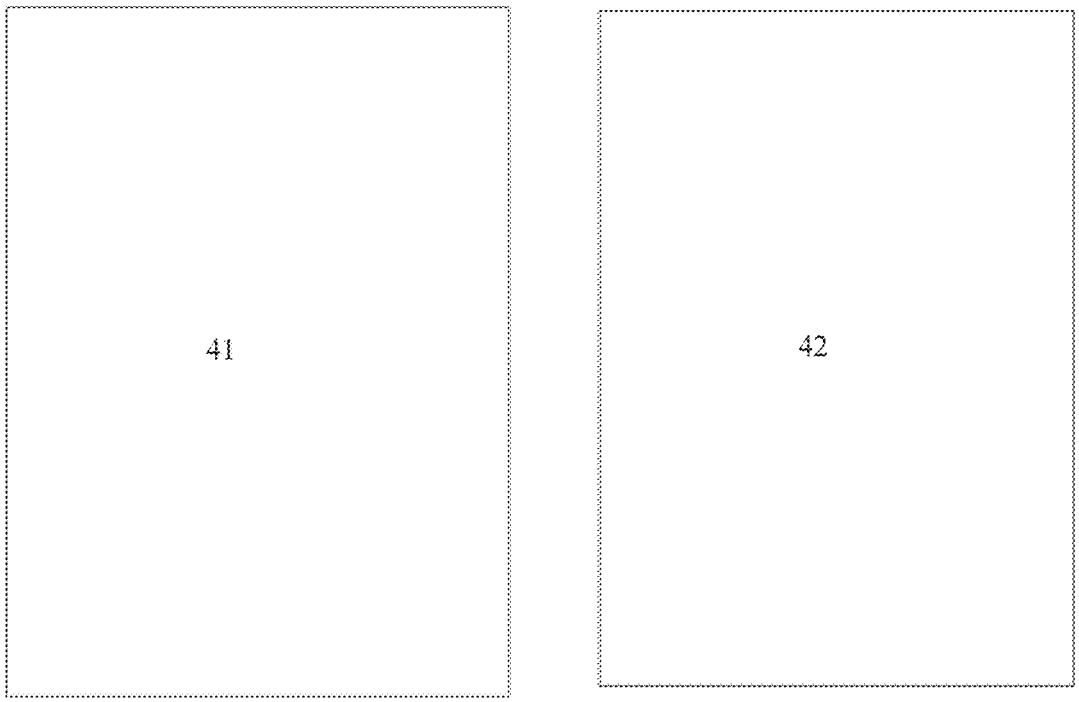
FIG. 4C is a schematic diagram of a third example scenario of an FOV relationship between a first camera and a second camera according to this application.

In some other embodiments, the two cameras are disposed at different locations of the electronic device 100. For example, one of the two cameras is disposed as a front-facing camera, and the other camera is disposed as a rear-facing camera. Regardless of whether the FOVs of the two cameras are the same. FOV areas of the two cameras do not overlap. As shown in FIG. 4C, an FOV area 41 is an FOV area range of one of the two cameras, an FOV area 42 is an FOV area range of the other of the two cameras, and the FOV area 41 does not overlap the FOV area 42.

Figure 5:
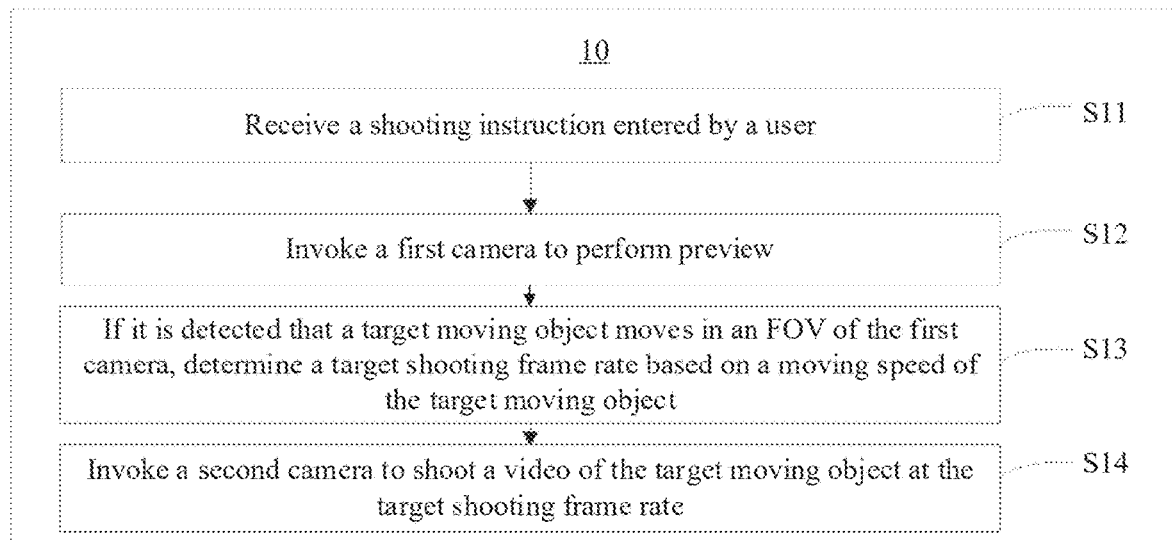
FIG. 5 is a schematic flowchart of a video shooting method 10 according to this application.

Based on this, FIG. 5 shows a video shooting method 10. The video shooting method (referred to as the method 10 for short hereinafter) includes the following steps.

Step S11: Receive a shooting instruction entered by a user.

The shooting instruction is used to instruct an electronic device to shoot a slow motion video. The shooting instruction may be a first shooting instruction or a second shooting instruction.

For example, corresponding to the embodiment shown in FIG. 3A-3, the electronic device 100 performs different scheduling on two cameras in different shooting scenarios. Based on this, when the user triggers the option 3111 (that is, the scenario 1 (shooting a train, a football, a bird, and the like)) shown in FIG. 3A-3, the electronic device receives the first shooting instruction. When the user triggers the option 3112 (that is, the scenario 2 (shooting fireworks and the like)) shown in FIG. 3A-3, the electronic device receives the second shooting instruction.

The shooting instruction in embodiments may be preset, and may be prestored in the internal memory 121 shown in FIG. 2A.

Step S12: Invoke a first camera to perform preview.

With reference to the foregoing descriptions of the implementation scenario, the first camera in embodiments is described.

It is assumed that the shooting instruction is the first shooting instruction (that is, an instruction for shooting a train, a football, a bird, and the like). In this case, in some embodiments, when the electronic device 100 includes two cameras, and a relationship between FOV areas of the two cameras is shown in FIG. 4A, the processor 110 may invoke a camera corresponding to the FOV area 41 as the first camera. In some other embodiments, when the electronic device 100 includes two cameras, and a relationship between FOV areas of two cameras is shown in FIG. 4B or FIG. 4C, the processor 110 may invoke any one of the two cameras as the first camera. In some other embodiments, when the electronic device 100 includes more than two cameras, the processor 110 may invoke a camera with a largest FOV in the more than two cameras as the first camera.

When the shooting instruction is the first shooting instruction (that is, an instruction for shooting a train, a football, a bird, and the like), an FOV of the first camera is relatively large A preview frame rate of the first camera may be a first frame rate, and the first frame rate is, for example, 30 fps.

It is assumed that the shooting instruction is the second shooting instruction (that is, an instruction for shooting fireworks and the like). In this case, in some embodiments, when the electronic device 100 includes two cameras, and a relationship between FOV areas of the two cameras is shown in FIG. 4A, the processor 110 may invoke a camera corresponding to the FOV area 42 in FIG. 4A as the first camera. In some other embodiments, when the electronic device 100 includes more than two cameras, shooting directions of the more than two cameras are the same, and FOVs of the more than two cameras are different, the processor 110 may invoke a camera with a smallest FOV in the more than two cameras as the first camera.

When the shooting instruction is the second shooting instruction (that is, an instruction for shooting fireworks and the like), an FOV of the first camera is relatively small, and a moving speed of a target moving object may be relatively fast. Therefore, a preview frame rate of the first camera may be a second frame rate. For example, the second frame rate may be a highest frame rate that can be supported by the first camera, and the second frame rate is, for example, 480 fps.

In some embodiments, the processor 110 may not enable a recording function of the first camera when invoking the first camera to perform preview. In addition, a preview picture of the first camera may not be displayed on the display 194.

Step S13: If it is detected that a target moving object moves in the FOV of the first camera, determine a target shooting frame rate based on a moving speed of the target moving object.

In some embodiments, if the first camera detects one moving object, the moving object is determined as the target moving object. In some other embodiments, if the first camera detects at least two moving objects at the same time, a moving object with a faster moving speed is determined as the target moving object. In some other embodiments, if the first camera detects at least two moving objects, and the at least two moving objects do not enter the FOV of the first camera at the same time, a moving object that first enters the FOV of the first camera is determined as the target moving object.

The target shooting frame rate is a shooting frame rate used when the electronic device 100 shoots a slow motion video. In some embodiments, the target shooting frame rate may be a best frame rate that can be supported by the electronic device 100 and that is obtained through calculation, for example, 900 fps. In some other embodiments, the target shooting frame rate is a shooting frame rate supported by a to-be-invoked second camera. The to-be-invoked second camera may be determined based on the best frame rate.

Figure 6A:
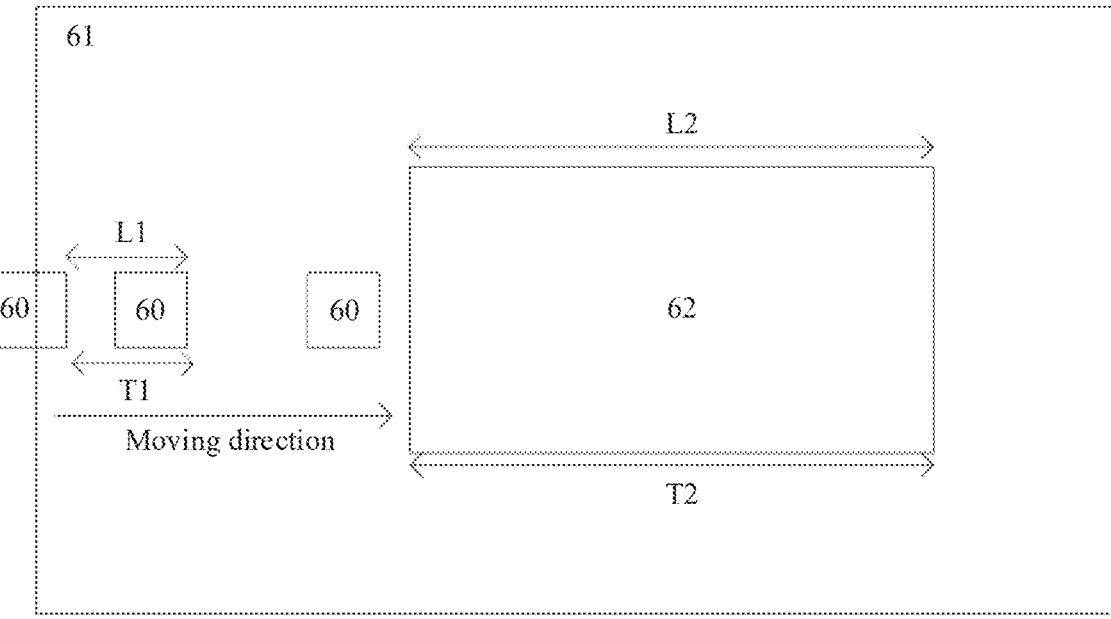
FIG. 6A is a schematic diagram of a first example moving scenario of a target moving object according to this application.

In some embodiments, the processor 110 may determine the best frame rate based on an FOV of a camera with a smallest FOV in all cameras of the electronic device 100. In embodiments, the FOV of the camera with a smallest FOV is referred to as a smallest FOV. For example, an FOV area 61 shown in FIG. 6A is an FOV area of the first camera, and an FOV area 62 is a smallest FOV area. After a target moving object 60 enters the FOV area 61, the processor 110 may calculate the best frame rate. The moving speed of the target moving object may be L1/T1. Further, the processor 110 may calculate the best frame rate f according to the following algorithm:

$$f = k * \frac{1}{T1},$$

and $$T2 = \frac{L2}{\frac{L1}{T1}} = T1 * \frac{L2}{L1},$$

With reference to FIG. 6A. T1 is first duration. L1 is a quantity of pixels by which the target moving object moves in the FOV area 61 within the first duration, L2 is a total quantity of pixels of the area 62 in a moving direction of the target moving object, T2 is total duration for which the target moving object passes through the area 62 at a shooting frame rate during preview, and k is an integer greater than 1. An FOV of the to-be-invoked second camera is not less than the smallest FOV. To ensure that the to-be-invoked second camera can shoot at least one frame of image, a shooting frame rate of the to-be-invoked second camera needs to be at least greater than or equal to 1/T1. Based on this, to obtain a slower playback effect, the target shooting frame rate f may be set to a value that is far greater than 1/T2 by using k, where k is, for example, 300.

In some embodiments, the first duration may be preset duration. The preset duration may be determined based on the FOV of the first camera. For example, a larger FOV of the first camera may indicate a larger maximum value of the preset duration, and a smaller FOV of the first camera may indicate a smaller maximum value of the preset duration. In this application, the preset duration is, for example, 0.05 seconds. In some other embodiments, the first duration may be a reciprocal of a frame rate used when the first camera performs preview. For example, if the frame rate used when the first camera performs preview is 30 fps, the first duration is 1/30 seconds. For another example, if the frame rate used when the first camera performs preview is 24 fps, the first duration is 1/24 seconds. Correspondingly, in embodiments, L1 is a quantity of pixels obtained after the target moving object moves in the FOV area 61 by one frame.

Although the scenario 1 is used as an example for description in FIG. 6A, the embodiment shown in FIG. 6A is also applicable to the scenario 2. During actual implementation, when the embodiment shown in FIG. 6A is applied to the scenario 2, the parameters may be flexibly set based on the scenario 2. Details are not described herein again.

In some embodiments, after the target moving object moves in the FOV of the first camera by a preset frame, the processor 110 starts to calculate the target shooting frame rate. The preset frame may be determined based on an actual moving speed of the target moving object, and the preset frame is, for example, five frames. In some other embodiments, when the moving object moves to a preset location in the FOV of the first camera, the processor 110 starts to calculate the target shooting frame rate. In this way, after it is determined that the target moving object enters an FOV of a second camera, and the moving speed of the target moving object is stable, the target shooting frame rate can be calculated, so as to avoid a case in which the target shooting frame rate is repeatedly calculated because one of a moving track and the moving speed of the target moving object is changed, thereby saving resources.

Further, the electronic device 100 may determine the target shooting frame rate and the second camera based on the best frame rate.

In some embodiments, when the electronic device 100 includes only two cameras, the second camera is the other camera than the first camera. For example, if a camera corresponding to the FOV area 41 in FIG. 4A is determined as the first camera, a camera corresponding to the FOV area 42 is determined as the second camera. The target shooting frame rate may be a frame rate supported by the second camera. For example, in a possible implementation, the processor 110 may select, as the target shooting frame rate, a frame rate that is in frame rates supported by the second camera and that is adjacent to the best frame rate and greater than the best frame rate. For example, the best frame rate is 650 fps, the shooting frame rates supported by the second camera include 120 fps, 240 fps, 480 fps, and 960 fps, and the processor 110 may determine 960 fps as the target shooting frame rate.

In some other embodiments, when the electronic device 100 includes more than two cameras, the processor 110 may calculate a difference between the best frame rate and each of frame rates supported by other cameras than the first camera to obtain one or more differences. Then, the processor 110 may determine whether a smallest difference in the one or more differences is less than a first threshold, where the first threshold is a value obtained by multiplying a frame rate corresponding to the smallest difference (referred to as a corresponding frame rate hereinafter) by a preset percentage. If the smallest difference is less than the first threshold, the processor 110 determines the corresponding frame rate as the target shooting frame rate, and determines a camera that supports the corresponding frame rate as the second camera. The preset percentage may be, for example, 25%. For example, the best frame rate is 500 fps, and the shooting frame rates supported by other cameras than the first camera in the electronic device 100 include 120 fps. 240 fps. 480 fps, and 960 fps. A difference between 480 fps and the best frame rate 500 fps is smallest, and the smallest difference is 20. In embodiments, the first threshold is 25% of 480 fps, that is, 120, and the smallest difference 20 is less than the first threshold 120. In this case, the processor 110 determines 480 fps as the target shooting frame rate, and determines a camera that supports 480 fps as the second camera.

It may be understood that the foregoing process of determining the target shooting frame rate and the second camera is merely an example for description, and the technical solutions in embodiments of this application are not limited thereto. In other embodiments of this application, the processor 110 may, for example, determine the target shooting frame rate and the second camera by using another method. Details are not described herein.

Step S14: Invoke the second camera to shoot a video of the target moving object at the target shooting frame rate.

Further, after determining the second camera, the processor 110 may invoke the determined second camera to shoot the video of the target moving object at the target shooting frame rate.

When the shooting instruction is the first shooting instruction (that is, the instruction for shooting a train, a football, a bird, and the like), in some embodiments, the processor 110 may invoke the second camera to perform shooting at the target shooting frame rate when the target moving object enters the FOV of the second camera. In some other embodiments, the processor 110 may invoke the second camera to perform shooting at the target shooting frame rate when the target moving object enters the FOV of the second camera for a period of time, or when the target moving object enters a preset area of the FOV of the second camera. In embodiments, the processor 110 may determine, based on total duration of a slow motion video that is to be obtained, a time or an area for starting the second camera. For example, the total duration of shooting the slow motion video is 15 seconds(s). When the shooting instruction is the second shooting instruction (that is, the instruction for shooting fireworks and the like), because the FOV of the second camera is greater than the FOV of the first camera, after determining the target shooting frame rate, the processor 110 may immediately start the second camera to perform shooting at the target shooting frame rate.

It can be learned that, in this implementation, after receiving the instruction for shooting the slow motion video, the electronic device including the at least two cameras invokes one of the at least two cameras to perform preview. After previewing the target moving object, the electronic device calculates, based on the moving speed of the target moving object, the target shooting frame rate for shooting the slow motion video. Then, the electronic device invokes the other of the at least two cameras to shoot the slow motion video of the moving object at the target shooting frame rate. In this way, the electronic device can automatically determine the shooting frame rate. In this way, not only a degree of intelligence and a degree of automation are high, but also a relatively suitable shooting frame rate can be determined based on an actual moving speed of the moving object, so that a shooting effect can be optimized, and user experience can be improved.

It may be understood that the method 10 is only an optional implementation of this application. In some other embodiments, after determining the second camera, the electronic device 100 may further calculate a moment for starting the second camera.

It should be noted that the electronic device 100 needs to occupy a specific period of time from a moment for starting the second camera to a moment for performing a shooting operation by using the second camera. Based on this, in embodiments of this application, the electronic device 100 may determine the moment for starting the second camera, so that a shooting operation can be performed at a preset shooting moment by using the second camera.

Figure 6B:
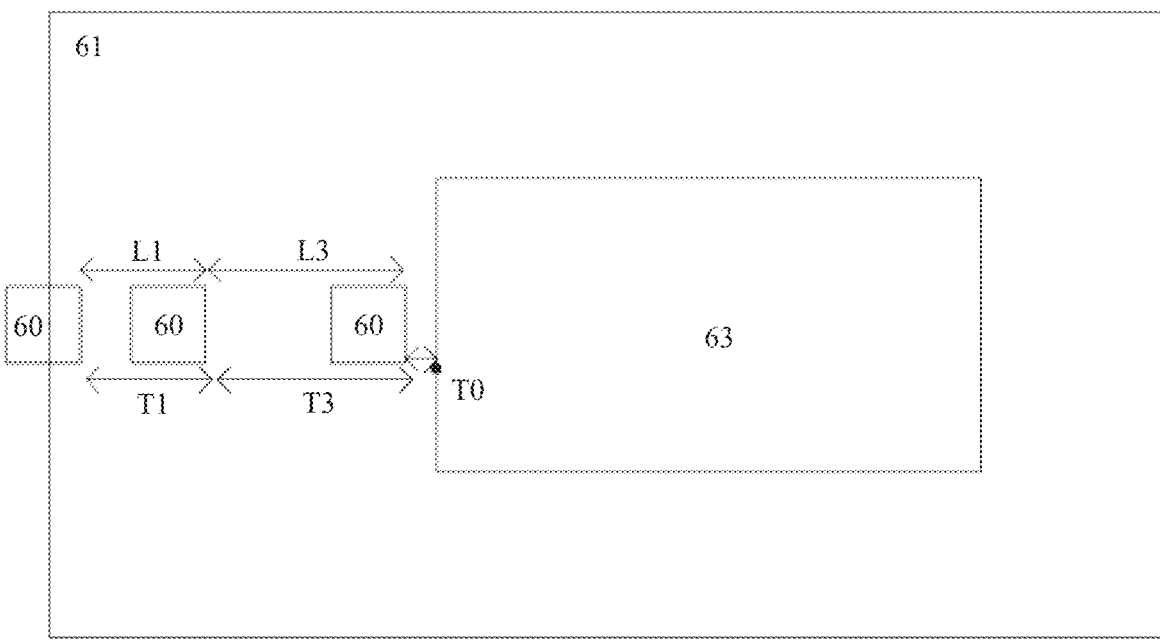
FIG. 6B is a schematic diagram of a second example moving scenario of a target moving object according to this application.

For example, as shown in FIG. 6B, an FOV area 61 is an FOV area of the first camera, and an FOV area 63 is an FOV area of the second camera. A target moving object 60 enters the FOV area 61, and after determining the second camera, the processor 110 may calculate a shooting parameter of the second camera.

With reference to FIG. 6B, the electronic device 100 may calculate, according to the following algorithm, a moment T3 for starting the second camera.

$$T3 = \frac{L3}{L1} * T1 - T0.$$

Meanings of L1 and T1 are described in the foregoing embodiment. Details are not described herein again. T0 is a moment at which the second camera is started to perform a shooting operation, and T0 is known. L3 is a quantity of pixels between the target moving object and a location 30 at which the second camera starts shooting.

Further, after T3 is obtained, the electronic device 100 may start the second camera at the moment T3. Then, the second camera is started within duration from the moment T3 to the moment T0, the electronic device 100 may use the second camera to shoot the slow motion video of the target moving object at the moment T0.

Similarly, in some other embodiments, after determining the second camera, the electronic device 100 may further calculate a trigger location for starting the second camera, where the trigger location is a location to which the target moving object moves.

For example, with reference to FIG. 6B, the electronic device 100 may calculate the trigger location D according to the following algorithm, where $$D = \frac{T3 - Tn}{T1} * L1.$$

Herein, Tn is a current moment. Meanings of T1, T3, and L1 are described in the foregoing embodiment. Details are not described herein again.

Further, after determining the trigger location, the electronic device 100 may start the second camera when the target moving object moves to the trigger location. After the second camera is started, the electronic device 100 controls the second camera to shoot the slow motion video of the target moving object.

It should be noted that, it is assumed that, after the target moving object enters the FOV of the first camera, the electronic device 100 calculates, by using a centerline of the target moving object as a reference, a pixel, a time, and the like obtained after the target moving object moves by one frame. In this case, in embodiments, the electronic device also determines, by using the centerline of the target moving object as a reference, whether the target moving object arrives at the foregoing trigger location. It is assumed that, after the target moving object enters the FOV of the first camera, the electronic device 100 calculates, by using one edge of the target moving object (for example, a right edge of the target moving object in FIG. 6B) as a reference, a pixel, a time, and the like obtained after the target moving object moves by one frame. In this case, in embodiments, the electronic device also determines, by using the corresponding edge of the target moving object (the right edge of the target moving object in FIG. 6B) as a reference, whether the target moving object arrives at the foregoing trigger location.

It can be learned that, in this implementation, the electronic device can start the second camera at a proper time based on the moving speed of the target moving object or the like, so that the second camera starts to perform shooting at a preset shooting moment. In this way, when the target moving object enters a trigger area, it can be ensured that the second camera can capture the target moving object, so that the electronic device does not need to cache several videos of a moment at which the target moving object enters the trigger area, thereby saving storage space.

In addition, during actual execution, before a device video is shot, focusing further needs to be performed on the second camera. Based on this, to further optimize a shooting effect, in some other embodiments, after it is detected that the target moving object moves in the FOV of the first camera, the processor 110 may further obtain a parameter such as a focal length of the first camera, and further determine a focal length of the second camera based on the parameter such as the focal length of the first camera, so as to perform focusing on the second camera before the second camera is started.

In some other embodiments, after it is detected that the target moving object moves in the FOV of the first camera, the processor 110 may further obtain at least one of an auto white balance (auto white balance) parameter, an auto exposure (auto exposure) parameter, and an automatic focus (automatic focus) parameter of the first camera. Further, before the second camera is started, the processor 110 determines an exposure parameter of the second camera based on the obtained parameter.

It may be understood that the foregoing embodiments are all example descriptions, and the technical solutions in embodiments of this application are not limited thereto. In an actual implementation process of this application, the electronic device may be implemented in one manner of the foregoing embodiments, or may be implemented in any combination manner of the foregoing embodiments. This is not limited herein.

In conclusion, in the implementations of this application, an electronic device including at least two cameras may use one of the at least two cameras to preview a target moving object. Then, the electronic device determines a shooting camera a shooting frame rate of the shooting camera, a start moment, a focal length, an exposure parameter, and the like based on a moving parameter of the target moving object during preview, an attribute parameter of a preview camera, and the like, and then starts, based on the determined data, the shooting camera in the at least two cameras to shoot a slow motion video. In this way, not only a best shooting frame rate can be determined based on a moving speed of the target moving object, to achieve a high degree of intelligence, but also storage space can be saved, to optimize a shooting effect.

Based on the foregoing embodiments, in some other embodiments, after the user triggers, in the GUI corresponding to FIG. 3A-4. "multi-screen display" indicated by the option 3113, the electronic device 100 receives an instruction for multi-screen display. Further, in embodiments, when invoking the second camera to shoot the video of the target moving object, the electronic device 100 may further enable a recording (that is, shooting) function of the first camera. That is, the electronic device 110 may shoot the target moving object by using both the first camera and the second camera. A shooting frame rate used when the first camera shoots a video may be a third shooting frame rate. The third shooting frame rate is different from the target shooting frame rate. The third shooting frame rate may be the same as a frame rate used when the first camera performs preview. In some embodiments, the third shooting frame rate may alternatively be different from a frame rate used when the first camera performs preview. This is not limited herein. After shooting is completed, the electronic device 100 may view, on the display 194, two video pictures shown in FIG. 3B-1 or FIG. 3B-2. Then, the electronic device 100 may further receive another instruction entered by the user, and perform an operation corresponding to the instruction, so that the display 194 presents a display effect shown in FIG. 3B-3, FIG. 3B-4, or the like.

It can be learned that, in this implementation, the electronic device can simultaneously perform shooting by using at least two cameras, so that videos played at different frame rates can be obtained, thereby improving viewing experience of the user.

The following describes the video shooting method in embodiments of this application with reference to examples.

For example, in some embodiments, this application provides, for example, a smartphone 200. For example, the smartphone 200 is provided with a wide-angle camera and a long-focus camera, and both the wide-angle camera and the long-focus camera are rear-facing cameras of the smartphone 200. A shooting direction of the wide-angle camera is the same as a shooting direction of the long-focus camera. An FOV of the wide-angle camera is greater than an FOV of the long-focus camera. For example, the FOV of the long-focus camera is completely within the FOV of the wide-angle camera, and a presentation effect is similar to that shown in FIG. 4A. Details are not described herein again. A Camera app is installed in the smartphone 200.

Example 1: Shoot a Slow Motion Video of a Football Shooting Moment

After the user opens the Camera app, the user may trigger the option 3111 (scenario 1) in the "slow motion" option. In this process, for a process of human-computer interaction between the user and the smartphone 200, and an interface change presented by the GUI in the process of interaction between the user and the smartphone 200, refer to the embodiments shown in FIG. 3A-1 to FIG. 3A-3. Details are not described herein again.

Correspondingly, the smartphone 200 receives a first shooting instruction. Further, the smartphone 200 starts, in response to the first shooting instruction, the wide-angle camera to perform preview. In embodiments, for example, the wide-angle camera performs preview at 30 fps. In addition, the smartphone 200 does not enable a recording function of the wide-angle camera.

Figure 7A:
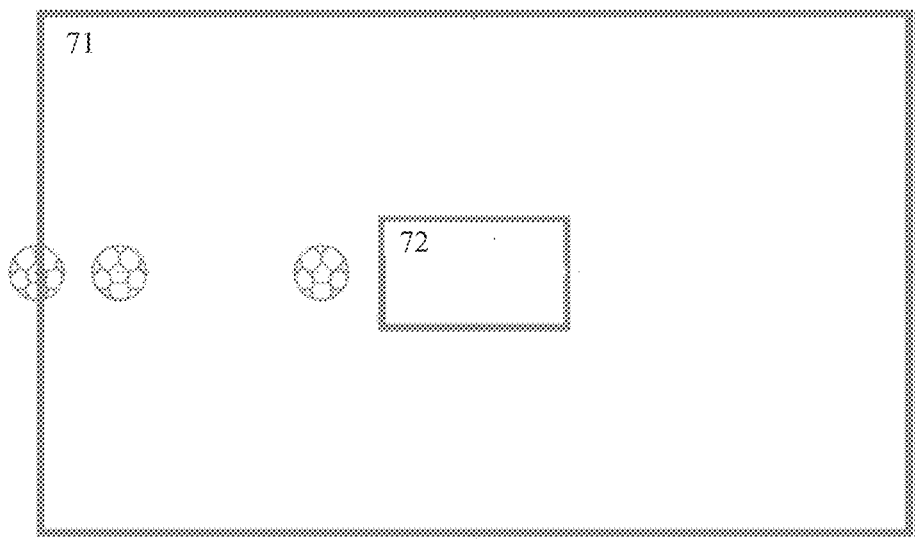
FIG. 7A is a schematic diagram of a first example scenario of a slow motion video shooting scenario according to this application.

With reference to FIG. 7A, an area 71 is an FOV area of the wide-angle camera, and an area 72 is an FOV area of the long-focus camera. After the smartphone 200 detects that the football enters the FOV area 71 of the wide-angle camera, the smartphone 200 may, for example, determine a quantity L1 of pixels by which a football moves within duration T1. In embodiments, T1 is, for example, 1/30 seconds. Correspondingly, L1 is a quantity of pixels that the football moves by one frame in the area 71. Then, the smartphone 200 may, for example, determine a target shooting frame rate of the long-focus camera based on a moving speed of the football. For example, the smartphone 200 may determine a best frame rate f in the manner in the embodiment shown in FIG. 6A. In embodiments, the smartphone 200 includes only two cameras. Therefore, a smaller FOV is the FOV of the long-focus camera. The smartphone 200 may determine the best frame rate f according to $$f = k * \frac{1}{T2},$$

and $$T2 = T1 * \frac{L2}{L2}.$$

Meanings of L2, T2, and k are described in the embodiment corresponding to FIG. 6A. Details are not described herein again. In embodiments, the best frame rate f is, for example, 450 fps. For example, frame rates supported by the long-focus camera include 30 fps, 240 fps, 480 fps, and 960 fps. Correspondingly, the smartphone 200 determines the target shooting frame rate of the long-focus camera as 480 fps.

Further, the smartphone 200 may further determine, based on the quantity L1 of pixels and the duration T1, a moment T0 at which the long-focus camera performs shooting. Further, the smartphone 200 obtains, through calculation, a moment T3 at which the long-focus camera is started, where $$T3 = \frac{L3}{L1} * T1 - T0.$$

A meaning of L3 is described in the embodiment shown in FIG. 6B. Details are not described herein again.

In addition, the smartphone 200 may further determine a focal length of the long-focus camera, an exposure parameter of the long-focus camera, and the like. Details are not described herein.

For example, to avoid a computing resource waste caused because a moving direction of the football changes halfway, in embodiments, the smartphone 200 may start to determine the target shooting frame rate of the long-focus camera, the moment T3 at which the long-focus camera is started, the focal length of the long-focus camera, and the exposure parameter of the long-focus camera after the football moves by five frames.

Further, the smartphone 200 starts the long-focus camera at the moment T3, so that the long-focus camera shoots a video of a football shooting moment by using the determined focal length, exposure parameter, and target shooting frame rate 480 fps.

In embodiments, the user cannot view a picture previewed by the wide-angle camera on the display of the smartphone 200, that is, a picture in the area 71 shown in FIG. 7A. A picture that the user can view on the display is, for example, the slow motion video of the football shooting moment, that is, a picture in the area 72 shown in FIG. 7A.

It should be noted that, in some other embodiments, the smartphone 300 includes rear-facing cameras: a wide-angle camera and a long-focus camera, where a shooting direction of the wide-angle camera of the smartphone 300 is different from a shooting direction of the long-focus camera of the smartphone 300, an FOV area of the long-focus camera partially overlaps an FOV area of the wide-angle camera and a presentation effect is similar to that shown in FIG. 4B. In embodiments, in a process of shooting the slow motion video of the scenario in the example 1, the smartphone 300 may invoke the wide-angle camera to perform preview and invoke the long-focus camera to perform shooting, or may invoke the long-focus camera to perform preview and invoke the wide-angle camera to perform shooting. This application is not limited thereto. In addition, an implementation process of shooting a slow motion video by a smartphone 300 and a process of determining a parameter such as a target shooting frame rate by the smartphone 300 are similar to those of the smartphone 200 in the example 1. Details are not described herein.

Example 2: Shoot a Slow Motion Video of a Fireworks Blooming Moment

In embodiments, after the user opens the Camera app, the user may trigger the option 3112 (scenario 2) in the "slow motion" option. In this process, for a process of human-computer interaction between the user and the smartphone 200, and an interface change presented by the GUI in the process of interaction between the user and the smartphone 200, refer to the embodiments shown in FIG. 3A-1 to FIG. 3A-3 Details are not described herein again.

The smartphone 200 receives a second shooting instruction. Further, the smartphone 200 may start, in response to the second shooting instruction, the long-focus camera to perform preview. In embodiments, a preview frame rate of the long-focus camera is, for example, 960 fps.

Figure 7B:
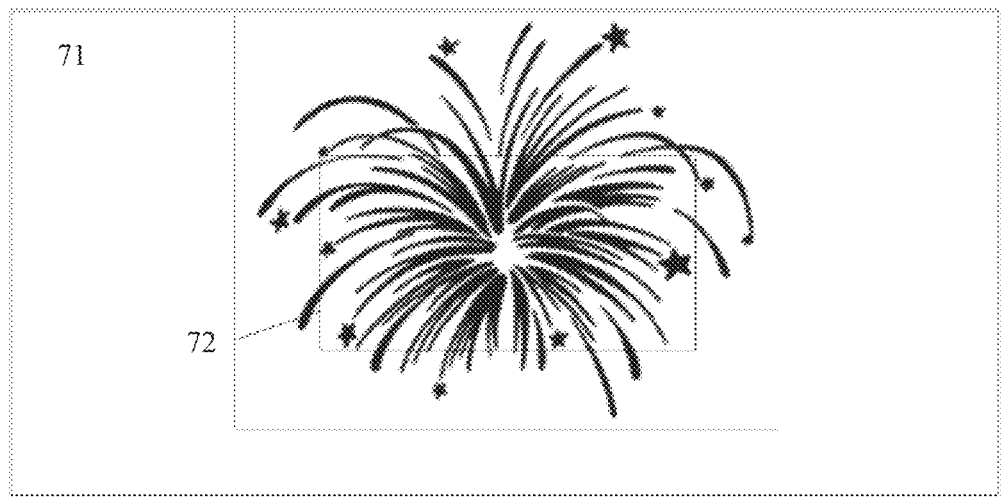
FIG. 7B is a schematic diagram of a second example scenario of a slow motion video shooting scenario according to this application.

With reference to FIG. 7B, meanings of an area 71 and an area 72 are the same as those in FIG. 7A. Details are not described herein. In embodiments, the user can, for example, view a viewfinder of the long-focus camera. Further, the user may, for example, align the long-focus camera of the smartphone 200 with a center location of fireworks at the fireworks blooming moment, to trigger the smartphone 200 to calculate a parameter for shooting the slow motion video. In embodiments, after the fireworks move by one frame, the smartphone 200 may start to calculate various parameters.

Similar to the foregoing embodiment, the smartphone 200 calculates a shooting frame rate of the wide-angle camera, a focal length of the wide-angle camera, and an exposure parameter of the wide-angle camera based on a quantity of pixels and duration that the fireworks move by one frame in the area 72, and after determining the foregoing parameters, immediately starts the wide-angle camera to perform shooting based on the foregoing parameters. In embodiments, the shooting frame rate of the wide-angle camera is, for example, 240 fps.

In embodiments, although the user can view the viewfinder of the long-focus camera, the user cannot view a picture previewed by the long-focus camera, that is, a picture in the area 72. A picture that the user can view on the display is, for example, the slow motion video of the fireworks blooming moment, that is, a picture in the area 71 shown in FIG. 7B.

In some other embodiments, this application provides, for example, a smartphone 400. For example, the smartphone 400 is provided with a front-facing camera and a rear-facing camera, and a shooting direction of the front-facing camera is completely opposite to a shooting direction of the rear-facing camera. A relationship between an FOV of the front-facing camera and an FOV of the rear-facing camera is shown in FIG. 4C. Details are not described herein again. A Camera app is installed in the smartphone 400.

Example 3: Shoot a Slow Motion Video in which a Character Runs from the Back to the Front of the User In embodiments, the smartphone 400 may support shooting of only one scenario. Correspondingly, the smartphone 400 may not provide the option 3111 and the option 3112 shown in FIG. 3A-3. After the user triggers the "slow motion" option in FIG. 3A-2, the user triggers the smartphone 400 to shoot the slow motion video. In embodiments, for a process of human-computer interaction between the user and the smartphone 400, and an interface change presented by the GUI in the process of interaction between the user and the smartphone 400, refer to the embodiments shown in FIG. 3A-1 and FIG. 3A-2. Details are not described herein again.

Figure 7C:
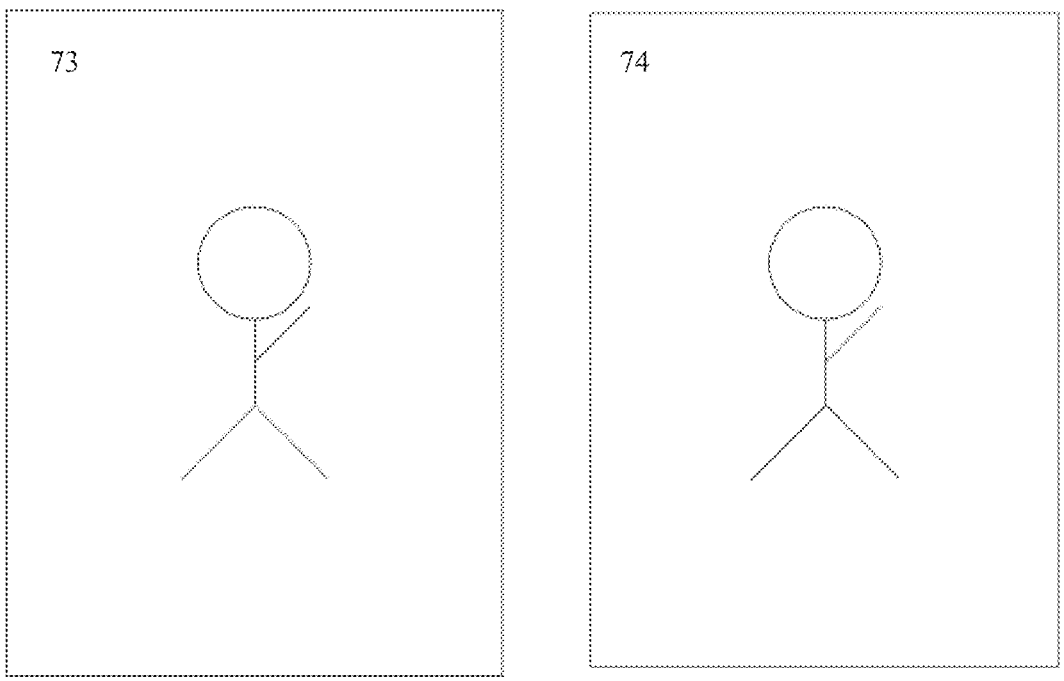
FIG. 7C is a schematic diagram of a third example scenario of a slow motion video shooting scenario according to this application.

Correspondingly, as shown in FIG. 7C, an area 73 is, for example, an FOV area of the front-facing camera, and an area 74 is, for example, an FOV area of the rear-facing camera. After receiving a shooting instruction, the smartphone 400 may start the front-facing camera to perform preview. For example, the front-facing camera performs preview at 30 fps. After a shot character enters the area 73, the smartphone 400 may determine a best frame rate based on a running speed of the shot character and a width of the area 74 in a running direction of the shot character, and further determine a target shooting frame rate of the rear-facing camera based on the best frame rate. The target shooting frame rate of the rear-facing camera is, for example, 240 fps. In embodiments, an implementation process of determining the target shooting frame rate of the rear-facing camera by the smartphone 400 is similar to the embodiment of determining the target shooting frame rate in the example 1. Details are not described herein again.

In addition, after the shot character enters the area 73, the smartphone 400 may detect a distance between the shot character and the user by using a laser. When the distance between the shot character and the user is 0, the smartphone 400 starts the rear-facing camera. After the rear-facing camera is started, the smartphone 400 uses the rear-facing camera to shoot, at the target shooting frame rate 240 fps, a slow motion video in which the shot character is running.

It may be understood that FIG. 7A and FIG. 7C are example descriptions, and the technical solutions of this application are not limited thereto. In some other embodiments, the electronic device may be another device with a plurality of cameras. There may be another applicable scenario, and details are not described herein. In addition, in some other embodiments, if the user wants to view a plurality of video pictures of the target moving object, the user may enter an instruction for "multi-screen display", to trigger the electronic device to display the plurality of pictures. Details are not described herein. In addition, this specification does not show all implementation scenarios applicable to this application. In another implementation scenario, another implementation method based on the technical idea of this application also falls within the protection scope of this application.

In conclusion, in the technical solutions in embodiments of this application, an electronic device including at least two cameras may use one of the at least two cameras to preview a target moving object. Then, the electronic device determines a shooting camera, a shooting frame rate of the shooting camera, a start moment, a focal length, an exposure parameter, and the like based on a moving parameter of the target moving object during preview, an attribute parameter of a preview camera, and the like, and then starts, based on the determined data, the shooting camera in the at least two cameras to shoot a slow motion video. In this way, not only a best shooting frame rate can be determined based on a moving speed of the target moving object, to achieve a high degree of intelligence, but also storage space can be saved, to optimize a shooting effect.

The foregoing embodiments describe the solutions of the video shooting method provided in this application from a perspective of a hardware structure, a software architecture, and actions executed by software and hardware of the electronic device. A person skilled in the art should be easily aware that, with reference to processing steps such as invoking cameras of different FOVs and determining a shooting frame rate in response to different shooing instructions described in embodiments disclosed in this specification, this application can be implemented in a form of hardware or a combination of hardware and computer software. Whether a function is executed in a form of hardware or computer software-driven hardware depends on specific applications and design constraint conditions of the technical solutions. A person skilled in the art may use different methods for each specific application to implement the described functions, but this implementation should not be understood as being beyond the scope of the embodiments of this application.

Figure 8A:
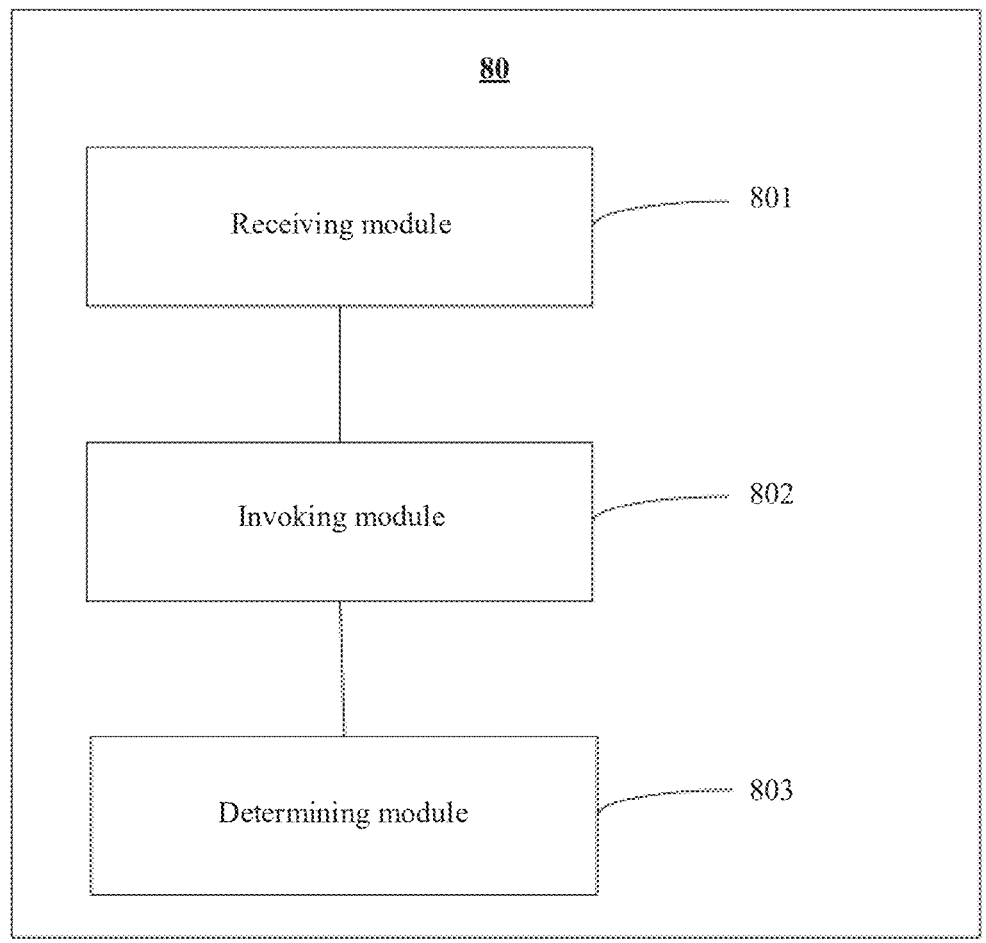
FIG. 8A is a schematic diagram of example composition of an electronic device 80 according to this application.

For example, the electronic device 100 may implement the foregoing corresponding function in a form of a function module. As shown in FIG. 8A, an electronic device 80 may include a receiving module 801, an invoking module 802, and a determining module 803. The electronic device 80 may be configured to perform operations of the electronic device in FIG. 3A-1 to FIG. 3B-4 and FIG. 5 to FIG. 7C.

For example, the receiving module 801 may be configured to receive a shooting instruction entered by a user. The invoking module 802 may be configured to invoke a first camera to perform preview. The determining module 803 may be configured to: when it is detected that a target moving object moves in an FOV of the first camera, determine a target shooting frame rate based on a moving speed of the target moving object. In embodiments, the invoking module 802 may be further configured to invoke a second camera to shoot a video of the target moving object at the target shooting frame rate.

It can be learned that, in an implementation of this application, after receiving an instruction for shooting a slow motion video, the electronic device may invoke the first camera of the electronic device to perform preview. After previewing the target moving object, the electronic device calculates, based on the moving speed of the target moving object, the target shooting frame rate for shooting the slow motion video, and then invokes the second camera to shoot the slow motion video of the target moving object based on the target shooting frame rate. In this way, the electronic device can automatically determine the shooting frame rate. In this way, not only a degree of intelligence and a degree of automation are high, but also a relatively suitable shooting frame rate can be determined based on an actual moving speed of the moving object, so that a shooting effect can be optimized, and user experience can be improved.

Optionally, the determining module 803 may be configured to: when the shooting instruction is a first shooting instruction, determine a camera with a relatively large FOV as the first camera. The determining module 803 may be further configured to: when the shooting instruction is a second shooting instruction, determine a camera with a relatively small FOV as the first camera.

Optionally, the invoking module 802 may be further configured to: when the shooting instruction is the first shooting instruction, invoke the first camera to perform preview at a first frame rate: or when the shooting instruction is the second shooting instruction, invoke the first camera to perform preview at a second frame rate.

Optionally, the determining module 803 may be further configured to: determine a best frame rate based on the moving speed of the target moving object; and determine, as the target shooting frame rate, a frame rate that is in frame rates supported by the second camera and that is adjacent to the best frame rate and greater than the best frame rate.

Optionally, the determining module 803 may be further configured to: calculate a difference between the best frame rate and each of frame rates supported by the second camera, to obtain one or more differences; determine whether a smallest difference is less than a first threshold, where the smallest difference belongs to the one or more differences, and the first threshold is a value obtained by multiplying a frame rate corresponding to the smallest difference by a preset percentage; and when the smallest difference is less than the first threshold, determine the frame rate corresponding to the smallest difference as the target shooting frame rate.

Optionally, the determining module 803 may be further configured to determine, according to $$T2 = \frac{L2}{\frac{L1}{T1}} = T1 * \frac{L2}{L1},$$

total duration T2 for which the target moving object passes through a shooting area of the second camera, where L2/L1 is the moving speed of the target moving object. T1 is first duration, L1 is a quantity of pixels by which the target moving object moves in the field of view of the first camera within the first duration, and L2 is a quantity of pixels of the shooting area of the second camera in a moving direction of the target moving object; and determine the best frame rate f according to $$f = k * \frac{1}{L1},$$

where k is an integer greater than 1.

Optionally, the determining module 803 may be further configured to determine one or more of the following parameters based on the moving speed of the target moving object: a moment of starting the second camera, a trigger location of starting the second camera, an exposure parameter of the second camera, and a focal length of the second camera, where the trigger location is a location to which the moving object moves.

Optionally, the invoking module 802 may be further configured to: when invoking the second camera to shoot the video of the target moving object at the target shooting frame rate, invoke the first camera to shoot the video of the target moving object at a third shooting frame rate, where the third shooting frame rate is different from the target shooting frame rate.

Optionally, the electronic device 80 may further include a play module. The play module may be configured to play a first video file shot by the first camera and a second video file shot by the second camera, where a third shooting frame rate corresponding to the first video file is different from the target shooting frame rate corresponding to the second video file.

Figure 8B:
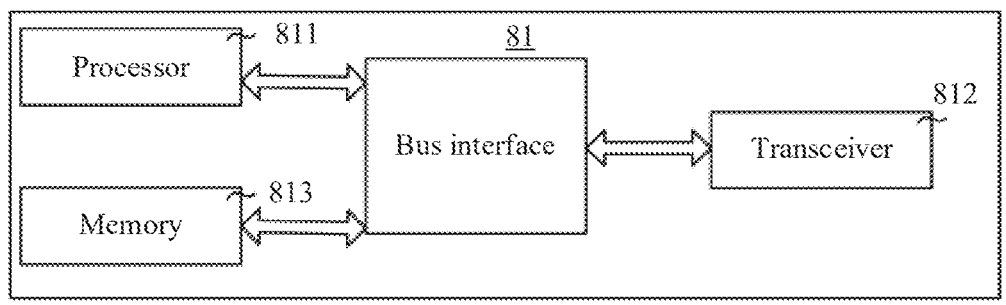
FIG. 8B is a schematic diagram of an example structure of an electronic device 81 according to this application.

It may be understood that division into the foregoing modules is merely logical function division, and all or some of the foregoing modules may be integrated into one physical entity, or may be physically separated during actual implementation. In embodiments of this application, the invoking module 802 and the determining module 803 may be implemented by a processor, and the receiving module 801 may be implemented by a transceiver. As shown in FIG. 8B, the electronic device 81 may include a processor 811, a transceiver 812, and a memory 813. The memory 813 may be configured to: store a program/code pre-installed when the electronic device 81 is delivered from a factory, or store code executed by the processor 811.

It should be understood that the electronic device 81 in embodiments of this application may correspond to the electronic device 100 in the foregoing embodiments. The transceiver 812 is configured to receive various instructions entered by a user, and the processor 811 is configured to execute video shooting operations of the electronic devices in FIG. 3A-1 to FIG. 3B-4 and FIG. 5 to FIG. 7C. Details are not described herein again.

For specific content, refer to descriptions of related parts in FIG. 3A-1 to FIG. 3B-4 and FIG. 5 to FIG. 7C. Details are not described herein again.

During specific implementation, corresponding to the electronic device, this application further provides a computer storage medium. A computer storage medium disposed in any device may store a program. When the program is executed, some or all of the steps in the embodiments of the video shooting method provided in FIG. 3A-1 to FIG. 3B-4 and FIG. 5 to FIG. 7C may be implemented. The storage medium in any device may be a magnetic disk, an optical disc, a read-only memory (read-only memory, ROM), a random access memory (random access memory, RAM), or the like.

In this application, the transceiver may be a wired transceiver. The wired transceiver may be, for example, an optical interface, an electrical interface, or a combination thereof. The wired transceiver may be, for example, various sensors. The processor may be a central processing unit (central processing unit, CPU), a network processor (network processor, NP), or a combination of a CPU and an NP. The processor may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory may include a volatile memory (volatile memory), such as a random-access memory (random-access memory, RAM). The storage device may also include a non-volatile memory (non-volatile memory), such as a read-only memory (read-only memory, ROM), a flash memory (flash memory), a hard disk drive (hard disk drive, HDD), or a solid-state drive (solid-state drive, SSD). The memory may further include a combination of the foregoing types of memories.

FIG. 8B may further include a bus interface. The bus interface may include any quantity of interconnected buses and bridges. Specifically, various circuits of one or more processors represented by the processor and a memory represented by the memory are linked together. The bus interface may further link various other circuits such as a peripheral device, a voltage regulator, and a power management circuit together. These are all well-known in the art. Therefore, details are not described in this specification. The bus interface provides interfaces. The transceiver provides units for communicating with various other devices on a transmission medium. The processor is responsible for managing a bus architecture and common processing, and the memory may store a packet used when the processor performs an operation.

A person skilled in the art may further learn that various illustrative logic blocks (illustrative logical blocks) and steps (steps) listed in embodiments of this application may be implemented by using electronic hardware, computer software, or a combination thereof. Whether such a function is implemented by using hardware or software depends on specific applications and system-wide design requirements. A person skilled in the art may implement the described functions by using various methods for each specific application, but this implementation should not be understood as being beyond the protection scope of embodiments of this application.

The various illustrative logic units and circuits described in embodiments of this application may implement or operate the described functions by using a design of a general-purpose processor, a digital signal processor, an application-specific integrated circuit (ASIC), a field programmable gate array (FPGA) or another programmable logic apparatus, a discrete gate or transistor logic, a discrete hardware component, or any combination thereof. The general-purpose processor may be a microprocessor. Optionally, the general-purpose processor may alternatively be any conventional processor, a controller, a microcontroller, or a state machine. The processor may alternatively be implemented by using a combination of computing apparatuses, such as a digital signal processor and a microprocessor, a plurality of microprocessors, one or more microprocessors combined with one digital signal processor core, or any other similar configuration.

The steps of the methods or algorithms described in embodiments of this application may be directly embedded into hardware, a software unit executed by the processor, or a combination thereof. The software unit may be stored in a RAM, a flash memory, a ROM, an EPROM, an EEPROM, a register, a hard disk, a removable disk, a CD-ROM, or another form of storage medium in the art. For example, the storage medium may be connected to the processor, so that the processor can read information from the storage medium, and can store and write information into the storage medium. Optionally, the storage medium may alternatively be integrated into the processor. The processor and the storage medium may be disposed in an ASIC, and the ASIC may be disposed in the electronic device. Optionally, the processor and the storage medium may alternatively be disposed in different components in the electronic device.

It should be understood that, in various embodiments of this application, a sequence number of the processes does not mean an execution sequence. The execution sequence of the processes should be determined according to functions and internal logic of the processes, and should not constitute any limitation on implementation processes of embodiments.

All or some of the foregoing embodiments may be implemented by using software, hardware, firmware, or any combination thereof. When the software is used for implementation, all or some of the foregoing embodiments may be implemented in a form of a computer program product. The computer program product includes one or more computer instructions. When the computer program instruction is loaded and executed on a computer, all or some of the procedures or the functions described in this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium, for example, transmitted from one website site, computer, server, or packet center to another website site, computer, server, or packet center in a wired (for example, coaxial cable, optical fiber, or digital subscriber line (DSL)) manner or a wireless (for example, infrared, wireless, or microwave) manner. The computer-readable storage medium may be any available medium accessible by a computer or a packet storage device such as a server or a packet center integrating one or more available media. The available medium may be a magnetic medium (for example, a floppy disk, a hard disk, a magnetic tape), an optical medium (for example, a DVD), or a semiconductor medium (for example, a solid-state drive (solid-state drive. SSD)).

All parts of this specification are described in a progressive manner. Same or similar parts of embodiments may be mutually referenced. Each embodiment focuses on a difference from another embodiment. In particular, the apparatus and system embodiments are basically similar to the method embodiments, and are described simply. For related parts, refer to the descriptions in the method embodiments.

Although preferred embodiments of this application have been described, a person skilled in the art may make another change and modification to these embodiments once they learn the basic creative concept. Therefore, the appended claims are intended to be construed as including preferred embodiments and all changes and modifications falling within the scope of this application.

It is clear that a person skilled in the art may make various changes and variations to this application without departing from the spirit and scope of this application. In this way, if these modifications and variations of this application fall within the scope of the claims of this application and the equivalent technologies thereof, this application is also intended to include these modifications and variations.

What is claimed is:

1. A video shooting method, applied to an electronic device, wherein the electronic device is provided with a first camera and a second camera, the first camera and the second camera are different in a field of view and a shooting direction, and the method comprises:
   receiving a shooting instruction entered by a user;
   when the shooting instruction is a first shooting instruction, determining a camera with a relatively large field of view as the first camera;
   when the shooting instruction is a second shooting instruction, determining a camera with a relatively small field of view as the first camera;
   invoking the first camera to perform preview;
   if it is detected that a target moving object moves in the field of view of the first camera, determining a target shooting frame rate based on a moving speed of the target moving object, wherein the target shooting frame rate is determined further based on a quantity of pixels by which the target moving object moves in the field of view of the first camera and a quantity of pixels of a shooting area of the second camera in a moving direction of the target moving object; and
   calculating a trigger location for starting the second camera before invoking the second camera to shoot a slow motion video of the target moving object at the target shooting frame rate, wherein the trigger location is a location in the field of view of the first camera to which the target moving object moves.

2. The method according to claim 1, wherein the invoking the first camera to perform preview comprises:
   when the shooting instruction is the first shooting instruction, invoking the first camera to perform preview at a first frame rate; or
   when the shooting instruction is the second shooting instruction, invoking the first camera to perform preview at a second frame rate.

3. The method according to claim 1, wherein the determining a target shooting frame rate based on a moving speed of the target moving object comprises:
   determining a best frame rate based on the moving speed of the target moving object; and
   determining, as the target shooting frame rate, a frame rate that is in frame rates supported by the second camera and that is adjacent to the best frame rate and greater than the best frame rate.

4. The method according to claim 1, wherein the determining a target shooting frame rate based on a moving speed of the target moving object comprises: determining a best frame rate based on the moving speed of the target moving object;
   calculating a difference between the best frame rate and each of frame rates supported by the second camera, to obtain one or more differences;
   determining whether a smallest difference in the one or more differences is less than a first threshold, wherein the first threshold is a value obtained by multiplying a frame rate corresponding to the smallest difference by a preset percentage; and
   if the smallest difference is less than the first threshold, determining the frame rate corresponding to the smallest difference as the target shooting frame rate.

5. The method according to claim 3, wherein the determining a best frame rate based on the moving speed of the target moving object comprises:
   determining, according to $T2=L2/(L1/T1)=T1*L2/L1$, total duration T2 for which the target moving object passes through the shooting area of the second camera, wherein L1/T1 is the moving speed of the target moving object, T1 is a first duration, L1 is the quantity of pixels by which the target moving object moves in the field of view of the first camera within the first duration, and L2 is the quantity of pixels of the shooting area of the second camera in the moving direction of the target moving object; and
   determining the best frame rate f according to $f=k*1/T2$, wherein k is an integer greater than 1.

6. The method according to claim 1, wherein if it is detected that the target moving object moves in the field of view of the first camera, the method further comprises:
   determining one or more of the following parameters based on the moving speed of the target moving object:
   a moment of starting the second camera, the trigger location of starting the second camera, an exposure parameter of the second camera, or a focal length of the second camera;
   wherein the trigger location is calculated using $D=(T3-Tn)/T1*L1$, wherein D is the trigger location, T3 is a moment at which the second camera is started, Tn is a current moment, T1 is a first duration, and L1 is a quantity of pixels in the field of view of the first camera the target moving object passes through during T1.

7. The method according to claim 1, wherein when the invoking the second camera to shoot a video of the target moving object at the target shooting frame rate, the method further comprises:
   invoking the first camera to shoot the video of the target moving object at a third shooting frame rate, wherein the third shooting frame rate is different from the target shooting frame rate.

8. The method according to claim 1, wherein after the invoking the second camera to shoot a video of the target moving object at the target shooting frame rate, the method further comprises:
   playing a first video file shot by the first camera and a second video file shot by the second camera.

9. An electronic device, comprising a processor and a memory, wherein
   the processor is coupled to the memory, the memory stores program code, and the processor invokes and executes the program code in the memory, so that the electronic device performs a video shooting method applied to the electronic device, wherein the electronic device is provided with a first camera and a second camera, the first camera and the second camera are different in a field of view and a shooting direction, and the method comprises:
   receiving a shooting instruction entered by a user;
   when the shooting instruction is a first shooting instruction, determining a camera with a relatively large field of view as the first camera;
   when the shooting instruction is a second shooting instruction, determining a camera with a relatively small field of view as the first camera;
   invoking the first camera to perform preview;
   if it is detected that a target moving object moves in the field of view of the first camera, determining a target shooting frame rate based on a moving speed of the target moving object, wherein the target shooting frame rate is determined further based on a quantity of pixels by which the target moving object moves in the field of view of the first camera and a quantity of pixels of a shooting area of the second camera in a moving direction of the target moving object; and calculating a trigger location for starting the second camera, before invoking the second camera to shoot a slow motion video of the target moving object at the target shooting frame rate, wherein the trigger location is a location in the field of view of the first camera to which the target object moves.

10. The electronic device of claim 9, wherein the invoking the first camera to perform preview comprises:
when the shooting instruction is the first shooting instruction, invoking the first camera to perform preview at a first frame rate; or
when the shooting instruction is the second shooting instruction, invoking the first camera to perform preview at a second frame rate.

11. The electronic device of claim 9, wherein the determining a target shooting frame rate based on a moving speed of the target moving object comprises:
determining a best frame rate based on the moving speed of the target moving object; and
determining, as the target shooting frame rate, a frame rate that is in frame rates supported by the second camera and that is adjacent to the best frame rate and greater than the best frame rate.

12. The electronic device of claim 9, wherein the determining a target shooting frame rate based on a moving speed of the target moving object comprises: determining a best frame rate based on the moving speed of the target moving object;
calculating a difference between the best frame rate and each of frame rates supported by the second camera, to obtain one or more differences;
determining whether a smallest difference in the one or more differences is less than a first threshold, wherein the first threshold is a value obtained by multiplying a frame rate corresponding to the smallest difference by a preset percentage; and
if the smallest difference is less than the first threshold, determining the frame rate corresponding to the smallest difference as the target shooting frame rate.

13. The electronic device of claim 11, wherein the determining a best frame rate based on the moving speed of the target moving object comprises:
determining, according to $T2=L2/(L1/T1)=T1*L2/L1$, a total duration $T2$ for which the $L1$ target moving object passes through the shooting area of the second camera, wherein $L1/T1$ is the moving speed of the target moving object, $T1$ is first duration, $L1$ is the quantity of pixels by which the target moving object moves in the field of view of the first camera within the first duration, and $L2$ is the quantity of pixels of the shooting area of the second camera in the moving direction of the target moving object; and
determining the best frame rate f according to $f=k*1/T2$, wherein k is an integer greater than 1.

14. The electronic device of claim 9, wherein if it is detected that the target moving object moves in the field of view of the first camera, the method further comprises:
determining one or more of the following parameters based on the moving speed of the target moving object:
a moment of starting the second camera, the trigger location of starting the second camera, an exposure parameter of the second camera, or a focal length of the second camera;
wherein the trigger location is calculated using $D=(T3-Tn)/T1*L1$, wherein D is the trigger location, $T3$ is a moment at which the second camera is started, $Tn$ is a current moment, $T1$ is a first duration, and $L1$ is a quantity of pixels in the field of view in the first camera the target moving object passes through during $T1$.

15. The electronic device of claim 9, wherein when the invoking the second camera to shoot a video of the target moving object at the target shooting frame rate, the method further comprises:
invoking the first camera to shoot the video of the target moving object at a third shooting frame rate, wherein the third shooting frame rate is different from the target shooting frame rate.

16. The electronic device of claim 9, wherein after the invoking the second camera to shoot a video of the target moving object at the target shooting frame rate, the method further comprises:
playing a first video file shot by the first camera and a second video file shot by the second camera.

17. A non-transitory computer readable storage medium comprising a computer program that causes a computer to execute a video shooting method applied to an electronic device, wherein the electronic device is provided with a first camera and a second camera, the first camera and the second camera are different in a field of view and a shooting direction, and the method comprises:
receiving a shooting instruction entered by a user, the shooting instruction being used to instruct the electronic device to shoot a video in slow motion;
when the shooting instruction is a first shooting instruction, determining a camera with a relatively large field of view as the first camera;
when the shooting instruction is a second shooting instruction, determining a camera with a relatively small field of view as the first camera;
invoking the first camera to perform preview;
if it is detected that a target moving object moves in the field of view of the first camera, determining a target shooting frame rate based on a moving speed of the target moving object, wherein the target shooting frame rate is determined based on a quantity of pixels by which the target moving object moves in the field of view of the first camera and a quantity of pixels of a shooting area of the second camera in a moving direction of the target moving object; and
calculating a trigger location for starting the second camera, wherein the trigger location is a location in the field of view of the first camera to which the target moving object moves before invoking the second camera to shoot a slow motion video of the target moving object at the target shooting frame rate.

18. The method according to claim 1, wherein the first camera is a long-focus camera type and the second camera is a wide-angle camera type.

* * * * *